United States Patent
Hattori

(10) Patent No.: US 11,481,108 B2
(45) Date of Patent: Oct. 25, 2022

(54) WEARABLE DEVICE AND NON-TRANSITORY COMPUTER READABLE MEDIUM

(71) Applicant: FUJIFILM Business Innovation Corp., Tokyo (JP)

(72) Inventor: Munehiro Hattori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 199 days.

(21) Appl. No.: 16/571,204

(22) Filed: Sep. 16, 2019

(65) Prior Publication Data

US 2020/0097167 A1   Mar. 26, 2020

(30) Foreign Application Priority Data

Sep. 25, 2018   (JP) .............................. JP2018-179374

(51) Int. Cl.
*G06F 3/04883*   (2022.01)
*G06F 1/16*   (2006.01)

(52) U.S. Cl.
CPC .......... *G06F 3/04883* (2013.01); *G06F 1/163* (2013.01); *G06F 1/1626* (2013.01); *G06F 1/1698* (2013.01)

(58) Field of Classification Search
CPC ...... G06F 1/163; G06F 1/1698; G06F 1/1652; G06F 2203/04803; G06F 3/017; G06F 3/04886; G09F 9/301; G09F 9/3023
See application file for complete search history.

(56) References Cited

U.S. PATENT DOCUMENTS

| 8,988,349 | B2 * | 3/2015 | Alberth | H04B 1/385 |
| | | | | 345/158 |
| 2015/0213580 | A1 | 7/2015 | Yamano et al. | |
| 2015/0227245 | A1 * | 8/2015 | Inagaki | G06F 1/163 |
| | | | | 345/173 |
| 2015/0277839 | A1 | 10/2015 | Stewart, III et al. | |
| 2017/0038845 | A1 * | 2/2017 | Chi | G06F 3/04845 |
| 2018/0307301 | A1 * | 10/2018 | Lee | G06F 3/011 |

FOREIGN PATENT DOCUMENTS

| JP | 2015141293 | 8/2015 |
| JP | 2017097411 | 6/2017 |

OTHER PUBLICATIONS

"Office Action of Japan Counterpart Application" with English translation thereof, dated Jun. 28, 2022, p. 1-p. 6.

* cited by examiner

*Primary Examiner* — Priyank J Shah
(74) *Attorney, Agent, or Firm* — JCIPRNET

(57) ABSTRACT

A wearable device includes a display screen on which information is displayed in a first region and a second region, a detection section that detects an operation for causing information to be displayed in the second region, and a control section that, in a state in which the display screen is worn on an arm, in a case of detecting the operation with the detection section after displaying non-secret information in the first region disposed at a position on an outer side of the arm that is visible to other people, controls a display of secret information in the second region disposed at a position on an inner side of the arm that is less visible to other people than the position on the outer side of the arm.

13 Claims, 18 Drawing Sheets

WEARABLE DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-179374 filed Sep. 25, 2018.

BACKGROUND

(i) Technical Field

The present disclosure relates to a wearable device and a non-transitory computer readable medium.

(ii) Related Art

Japanese Unexamined Patent Application Publication No. 2017-97411 discloses a mobile electronic device including a display unit and a contact detection unit that detects contact with the display unit by a contacting object. The mobile electronic device has a first state in which the display unit is cylindrically deformed and a second state in which the display unit is not cylindrically deformed. In the first state, in the case in which the contacting object contacts the display unit, an image is displayed by treating the vicinity of the contacted location on the display unit as a display region, while location other than the display region on the display unit are treated as a non-display region.

SUMMARY

In recent years, wristwatch-style wearable devices that process information while being worn on a user's body, such as on the arm or wrist for example, have begun to proliferate. A wristwatch-style wearable device is provided with a display screen for displaying information such as the time and received email to the user for example, and the user issues instructions to the wearable device by operating a touch panel installed overlaying or underlaying the display screen.

In such a wristwatch-style wearable device, when the display screen is pressed by the user, in the case in which there is information to notify the user about, the information is displayed at the touched position on the display screen. Consequently, since it is not known what kind of information will be displayed until the information is displayed on the display screen, sometimes secret information that the user does not want divulged to other people, such as the content of an email stating personal information about the user for example, may be displayed. Furthermore, in the case in which the position on the display screen pressed by the user where information is to be displayed is a position visible to other people, secret information will be displayed unintentionally at a position that will enter the field of view of other people.

Aspects of non-limiting embodiments of the present disclosure relate to keeping secret information from being viewed unintentionally by other people compared to the case of displaying information at a position specified by a user irrespectively of the content of the information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a wearable device including a display screen on which information is displayed in a first region and a second region, a detection section that detects an operation for causing information to be displayed in the second region, and a control section that, in a state in which the display screen is worn on an arm, in a case of detecting the operation with the detection section after displaying non-secret information in the first region disposed at a position on an outer side of the arm that is visible to other people, controls a display of secret information in the second region disposed at a position on an inner side of the arm that is less visible to other people than the position on the outer side of the arm.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments will be described with reference to the drawings. Note that structural elements and processes having the same function are denoted with the same signs throughout all drawings, and duplicate description is omitted.

First Exemplary Embodiment

Figure 1:
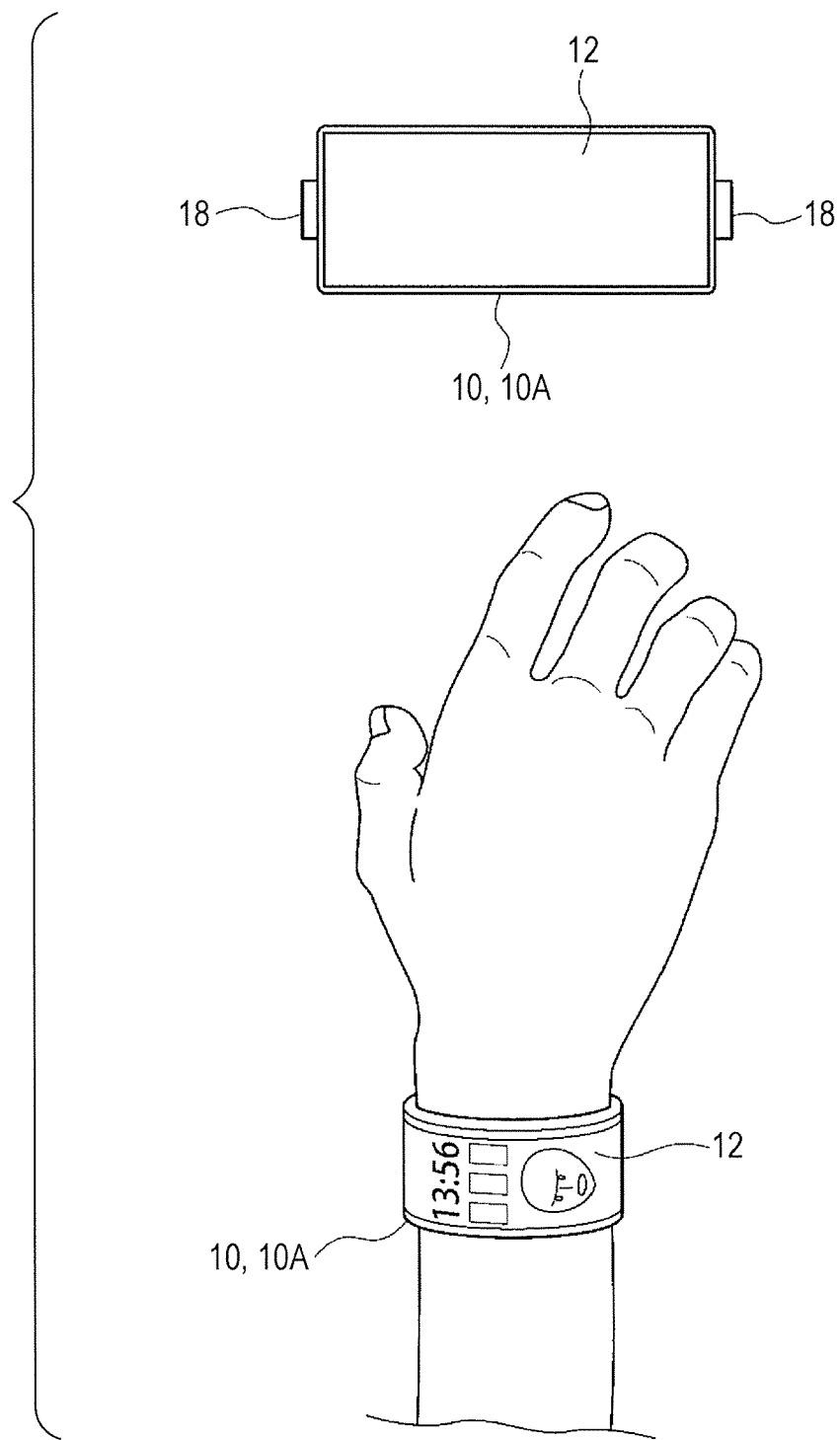
FIG. 1 is a diagram illustrating an exemplary exterior appearance of a wearable device.

FIG. 1 is a diagram illustrating an exemplary configuration of a wearable device 10 according to the present exemplary embodiment. As illustrated in FIG. 1, the wearable device 10 according to the present exemplary embodiment is what is called a wristwatch-style wearable device that is worn by being wound around a user's wrist or arm. In the present exemplary embodiment, the person wearing the wearable device 10 is called the "user".

The wearable device 10 is provided with a display screen 12 that displays various information, and a flexible display for example is used for the display screen 12 of the wearable device 10.

A flexible display is a deformable display that can be rolled up or bent by applying force like paper or cloth for example, and is realized by disposing organic electroluminescence (EL) elements on a plastic film substrate for example.

Consequently, in the wearable device 10 in which a flexible display is used for the display screen 12, the entire device forms the display screen 12, and takes a configuration in which the user wears the wearable device 10 by wrapping the display screen 12 around one's wrist or arm like the belt of a wristwatch. In the case of wearing the wearable device 10 on one's wrist, the user causes clasps 18 provided on opposite ends of the wearable device 10 to engage with each other, thereby causing force to be applied to put the display screen 12 in a state of being wrapped around the circumference of the wrist. The clasps 18 are one example of a wearing member according to the present exemplary embodiment.

On the other hand, in the state of not applying force to wrap the wearable device 10 around the circumference of one's wrist, the wearable device 10 is shaped like a planar flat display as illustrated in FIG. 1.

Figure 2:
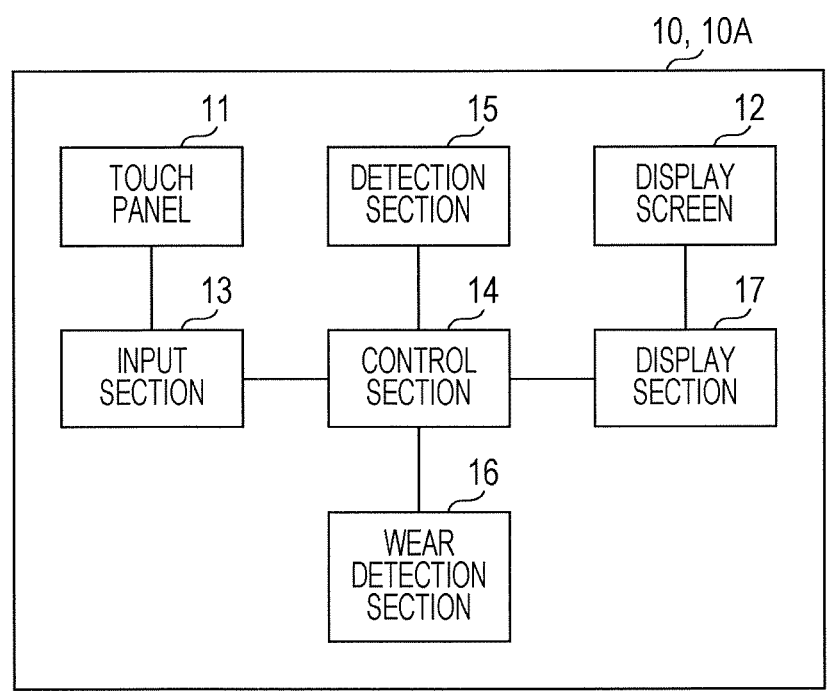
FIG. 2 is a diagram illustrating an exemplary functional configuration of the wearable device.

FIG. 2 illustrates an exemplary functional configuration of the wearable device 10. As illustrated in FIG. 2, the wearable device 10 is provided with the units of a touch panel 11 and the display screen 12, and the functional sections of an input section 13, a control section 14, a detection section 15, a wear detection section 16, and a display section 17.

The input section 13 receives position information about a position pressed by the user from the touch panel 11 installed overlaying or underlaying the display screen 12.

The control section 14 receives the position information from the input section 13, analyzes the user instruction performed on the wearable device 10 from the positional relationship between the received position information and the information being displayed on the display screen 12, and executes a process according to the user instruction.

User instructions are also reported to the control section 14 by methods other than pressing the touch panel 11. For example, the detection section 15 detects the motion of the wearable device 10, and notifies the control section 14 of a physical quantity measured in association with the motion of the wearable device 10. The control section 14 receives physical quantities expressing the motion of the wearable device 10 from the detection section 15, and analyzes the user instruction from the received physical quantities.

Specifically, the detection section 15 detects physical quantities expressing the degree of movement of the wrist on which the wearable device 10 is worn. The physical quantities expressing the degree of movement of the wrist may be, for example, the movement direction, the movement velocity, and the movement acceleration, as well as the rotational angle, the angular velocity, and the angular acceleration associated with rotation of the wrist. However, the physical quantities expressing the degree of movement of the wrist are not limited to these physical quantities, and physical quantities used as input values in an arithmetic expression that computes at least one of the physical quantities described above are also included among the physical quantities expressing the degree of movement of the wrist.

Herein, an example of the detection section 15 using a motion sensor 8 built into the wearable device 10 to detect physical quantities expressing the degree of movement of the wrist is described as one example, but the detection section 15 may also detect physical quantities expressing the degree of movement of the wrist by any method other than an operation associated with contact with the display screen 12 by the user.

In the following, the movement direction, the movement velocity, and the movement acceleration associated with the movement of the wrist are collectively designated the "movement amount", while the rotational angle, the angular velocity, and the angular acceleration associated with the rotation of the wrist are collectively designated the "rotation amount". The motion of the wrist is expressed by the combination of the movement amount and the rotation amount of the wrist. In other words, the degree of movement of the wrist is expressed by the combination of the movement amount and the rotation amount of the wrist.

Also, the motion sensor 8 is a sensor that includes an acceleration sensor that measures the movement amount of the wrist and a gyro sensor that measures the rotation amount of the wrist for example, and measures the degree of movement of the wrist.

The wear detection section 16 detects whether or not the wearable device 10 is being worn on the user's wrist, and notifies the control section 14 of the state of wear on the wrist.

The control section 14 notifies the display section 17 of a display instruction such that information corresponding to a processing state of the wearable device 10 is displayed at a specified position on the display screen 12 in accordance with at least one of a user instruction obtained from the input section 13, an operating state of the wearable device 10 obtained from the detection section 15, and the state of wear of the wearable device 10 on the user's wrist obtained from the wear detection section 16.

The display section 17 receives an instruction to display information from the control section 14, and displays the specified information at a position on the display screen 12 specified by the control section 14.

Note that, as described above, the present exemplary embodiment describes a wearable device 10 in which a flexible display is used for the display screen 12 as an example, but this is merely one example, and the use of a flexible display for the display screen 12 is not necessarily required insofar as the wearable device 10 is provided with the functional configuration illustrated in FIG. 2.

Figure 3:
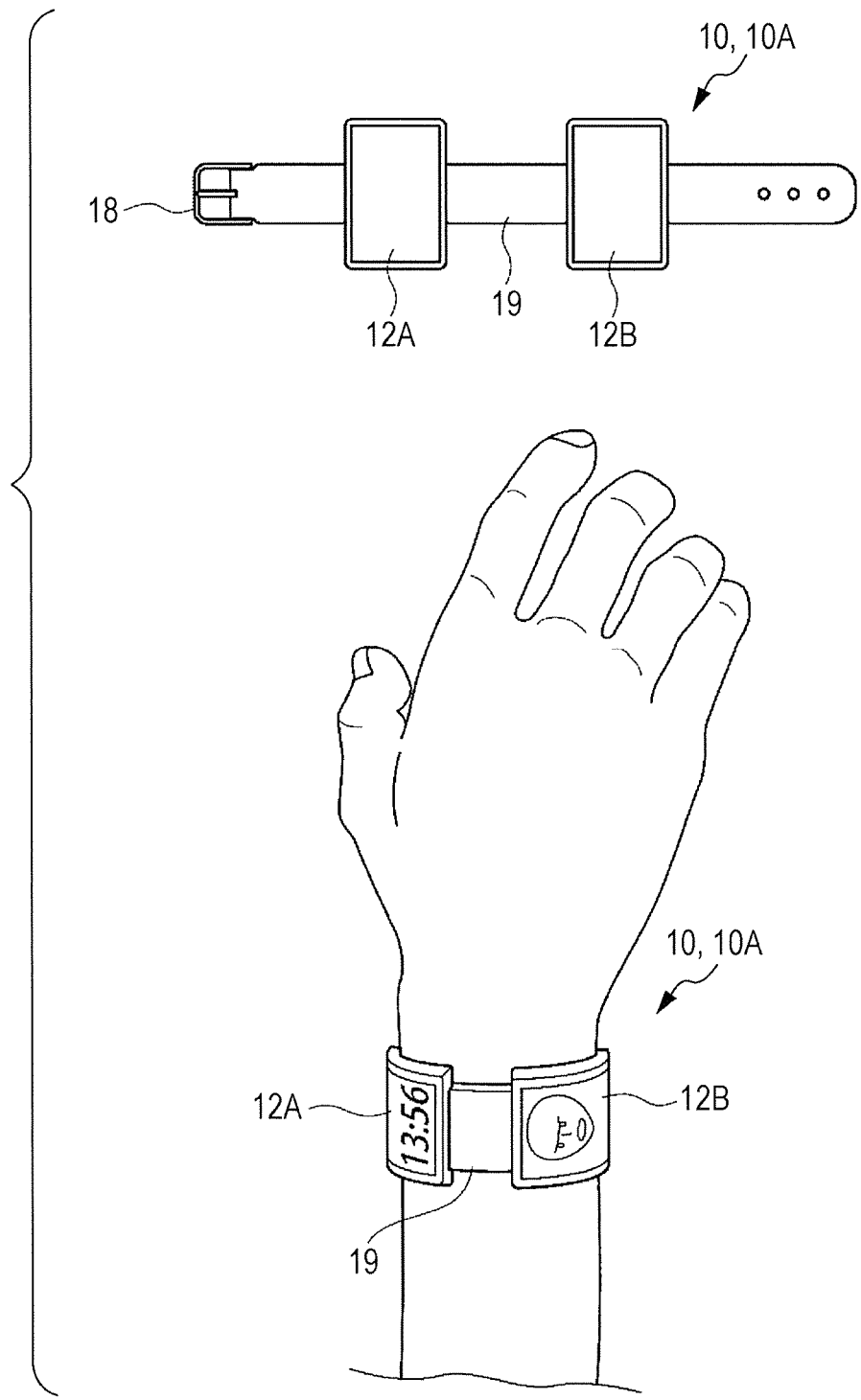
FIG. 3 is a diagram illustrating an exemplary exterior appearance of a pendant-style wearable device.

For example, a wearable device 10 like the one illustrated in FIG. 3 is also included in one example of the wearable device 10 according to the present embodiment.

The wearable device 10 illustrated in FIG. 3 is a wearable device 10 in which two independent display screens 12A and 12B are attached to a belt 19 that wraps the wearable device 10 around the wrist. Since the belt 19 deforms to wrap around the circumference of the wrist, the display screens 12A and 12B are not necessarily required to be flexible displays. Consequently, even if displays that do not deform when force is applied are used as the display screens 12A and 12B, the device is worn on the user's wrist and functions as the wearable device 10.

Figure 4:
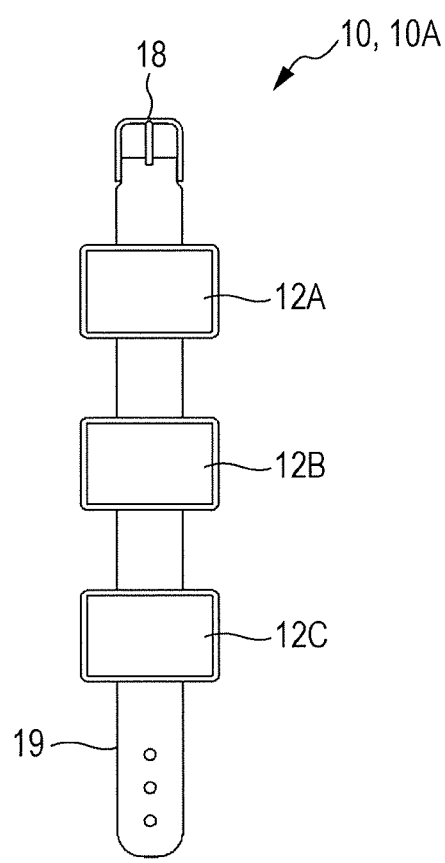
FIG. 4 is a diagram illustrating another exemplary exterior appearance of a pendant-style wearable device.

In this way, the wearable device 10 configured such that multiple display screens 12 are attached to the belt 19 that wraps around the user's wrist is sometimes called a "pendant-style wearable device 10". Since it is sufficient for there to be multiple display screens 12 in the pendant-style wearable device 10, as illustrated in FIG. 4 for example, a wearable device 10 provided with three display screens 12A, 12B, and 12C is also included among pendant-style wearable devices 10.

In the pendant-style wearable device 10, by causing a clasp 18 to penetrate through a hole provided on a belt for example, the wearable device 10 is put into a state of being wrapped around the circumference of the wrist, but the method of wearing the pendant-style wearable device 10 on the wrist is not limited. For example, similarly to the wearable device 10 illustrated in FIG. 1, the pendant-style wearable device 10 may also be worn on the user's wrist by causing clasps 18 provided on both ends of the belt 19 to engage with each other.

Figure 5:
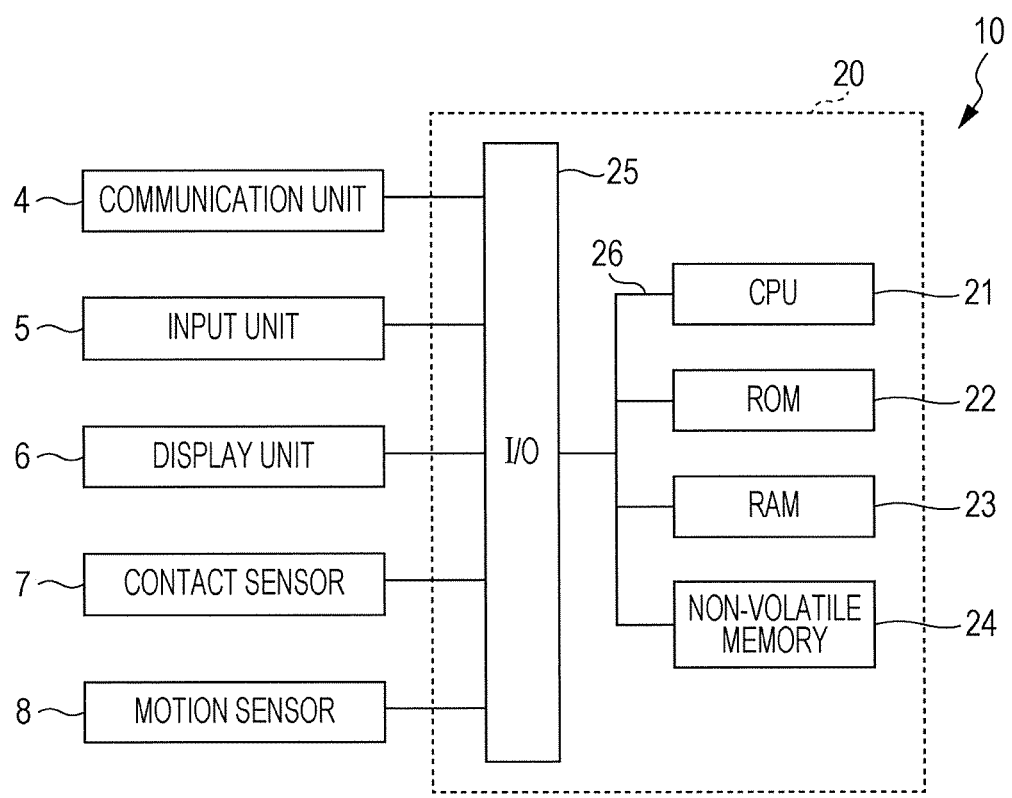
FIG. 5 is a diagram illustrating an exemplary schematic configuration of the electrical system in the wearable device according to a first exemplary embodiment.

The wearable device 10 is configured using a computer 20 for example. FIG. 5 is a diagram illustrating an exemplary schematic configuration of the electrical system in the wearable device 10.

The computer 20 is provided with a central processing unit (CPU) 21 responsible for each functional section of the wearable device 10 according to the present exemplary embodiment illustrated in FIG. 2, read-only memory (ROM) 22 that stores a control program, random access memory (RAM) 23 used as a temporary work area of the CPU 21, non-volatile memory 24, and an input/output interface (I/O) 25. Additionally, the CPU 21, ROM 22, RAM 23, non-volatile memory 24, and I/O 25 are interconnected through a bus 26.

The non-volatile memory 24 is one example of a storage device that retains stored information even if electric power supplied to the non-volatile memory 24 is cut off. Semiconductor memory is used for example, but a hard disk may also be used. The non-volatile memory 24 is not necessarily required to be built into the computer 20, and a storage device that is removable from the computer 20, such as a memory card, may also be used as the non-volatile memory 24. Additionally, instead of the non-volatile memory 24, the CPU 21 may also store information in a storage device connected through a communication unit 4 described later.

Meanwhile, a communication unit 4, an input unit 5, a display unit 6, a contact sensor 7, and a motion sensor 8 for example are connected to the I/O 25.

The communication unit 4 connects to a communication link not illustrated, and is provided with a communication protocol that executes data communication with external devices connected to the communication link. Besides a wireless local area network (LAN), the communication unit 4 may also support Bluetooth (registered trademark) used for communication over a line-of-sight distance of approximately 100 m, near field communication (NFC) used for communication over a short range of approximately 10 m, and the like.

The input unit 5 is an input device that receives and notifies the CPU 21 of instructions from the user. For example, buttons, a touch panel, and the like are used. Note that a camera that takes an image of the user, a microphone that introduces sound into the wearable device 10, and the like are also examples of the input unit 5, and different types of input unit 5 are provided in the wearable device 10 depending on the type of the wearable device 10.

The display unit 6 is a display device that displays information processed by the CPU 21 as an image. For example, an LCD, OLED display, or the like is used.

The contact sensor 7 is a sensor that notifies the CPU 21 with a binary on/off value indicating whether or not the clasps 18 of the wearable device 10 are engaged with each other. For example, the CPU 21 is notified of an on value when the clasps 18 are engaged with each other, and an off value when the clasps 18 are released from each other.

The motion sensor 8 is a sensor, including an acceleration sensor and a gyro sensor, that measures the motion of the user's wrist, and notifies the CPU 21 of the measured measurement value.

Note that the units and sensors connected to the I/O 25 are not limited to the units and sensors illustrated in FIG. 5. As described later for example, a biological sensor not illustrated that detects the pulse of the user may be connected to the I/O 25 instead of the contact sensor 7.

Figure 6:
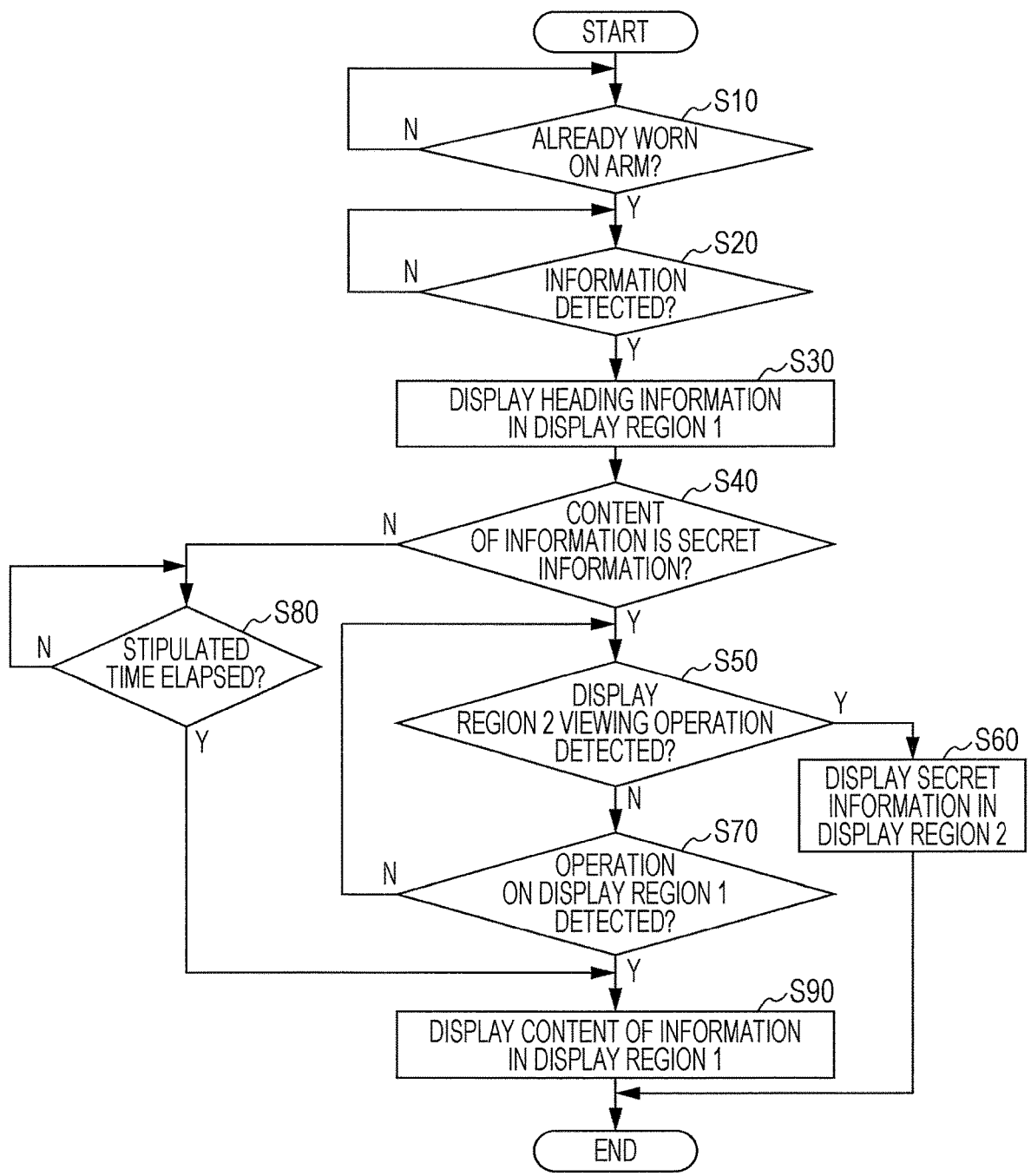
FIG. 6 is a flowchart illustrating one example of the flow of a display process according to the first exemplary embodiment.

Next, FIG. 6 will be referenced to describe operations of the wearable device 10 according to the present exemplary embodiment.

FIG. 6 is a flowchart illustrating one example of the flow of a display process executed by the CPU 21 in the case in which the power source of the wearable device 10 is set to on and the wearable device 10 boots up.

A control program that stipulates the display process is stored in advance in the ROM 22 of the wearable device 10 for example. The CPU 21 of the wearable device 10 loads the control program stored in the ROM 22 and executes the display process.

As described already, a wearable device 10 in which a flexible display is used for the display screen 12 is described herein, but a similar process is applied to a pendant-style wearable device 10. Note that for a pendant-style wearable device 10, in the case in which operations are different from the wearable device 10 using a flexible display, the portions where the operations differ will be described.

First, in step S10, the CPU 21 determines whether or not the wearable device 10 is being worn on the user's wrist. In the case in which the wearable device 10 is not being worn on the user's wrist, the determination process of step S10 is repeatedly executed to monitor the state of wear of the wearable device 10.

Whether or not the wearable device 10 is being worn on the user's wrist is determined according to the state of engagement of the clasps 18 for example. In the case of putting on the wearable device 10, the user causes the clasps 18 to engage with each other. In the case in which the clasps 18 of the wearable device 10 engage with each other, the contact sensor 7 switches to on, and therefore when the CPU 21 receives an on notification from the contact sensor 7, it is determined that the wearable device 10 is being worn on the user's wrist.

Note that the state of wear of the wearable device 10 on the wrist is not limited to a determination method by the contact sensor 7. For example, instead of the contact sensor 7, the state of wear of the wearable device 10 is also determined by a biological sensor not illustrated that detects pulse and is disposed on the other face different from the information display face of the display screen 12, or in other words, the contact face that contacts the user's wrist. In the case in which the wearable device 10 is wrapped around the user's wrist, the contact face of the display screen 12 contacts the wrist, and a pulse is detected by the biological sensor. Consequently, in the case in which a pulse is detected by the biological sensor, the CPU 21 may be configured to determine that the wearable device 10 is being worn on the user's wrist.

Additionally, biological information other than pulse may also be measured by the biological sensor. For example, the biological sensor may also measure biological information that is not measured unless the wearable device 10 is being worn on the body, such as the oxygen saturation in the blood or the blood pressure. In other words, in the case in which a measurement value of biological information measured by the biological sensor is inside a range obtained in the case in which the user is wearing the wearable device 10 on one's body, the CPU 21 may be configured to determine that the wearable device 10 is being worn on the user's wrist.

Also, in the case of a wearable device 10 in which a pressure sensor sheet not illustrated is disposed on the display screen 12, the CPU 21 may determine that the wearable device 10 is being worn on the user's wrist when a pressure equal to or greater than a predetermined value is measured by the pressure sensor. The predetermined value used to determine the wearing of the wearable device 10 on the wrist is set to a minimum value of a pressure value measured when any user wraps the display screen 12 around the circumference of one's wrist, for example. The minimum value is computed in advance by experiment with an actual wearable device 10, computer simulation based on the design specifications of the wearable device 10, or the like, and is stored in the non-volatile memory 24, for example. Obviously, a strain sensor may also be used instead of a pressure sensor.

In the case of determining that the wearable device 10 is being worn on the user's wrist in the determination process of step S10, the flow proceeds to step S20.

In step S20, the CPU 21 determines whether or not information notifying the user in association with the occurrence of some event has been detected. The "information notifying the user of the occurrence of an event" is information that the wearable device 10 preferably displays on the display screen 12 autonomously when detected even without receiving an instruction from the user, such as the reception of email, the reception of information from a social networking service (SNS), and reminder notifications, for example. The information notifying the user of the occurrence of an event includes not only information generated internally inside the wearable device 10 such as reminder notifications for example, but also information received from a communication link not illustrated through the communication unit 4.

In the case in which information notifying the user of the occurrence of an event is not detected, the determination process of step S20 is repeatedly executed to monitor information notifying the user of the occurrence of an event. On the other hand, in the case of detecting information notifying the user of the occurrence of an event, the flow proceeds to step S30.

In step S30, the CPU 21 displays information notifying the user of the occurrence of an event on the display screen 12. The information notifying the user of the occurrence of an event does not actually include the content of the event, but includes the type of event that has occurred. Consequently, in the following, the information notifying the user of the occurrence of an event will be called "heading information".

Figure 7:
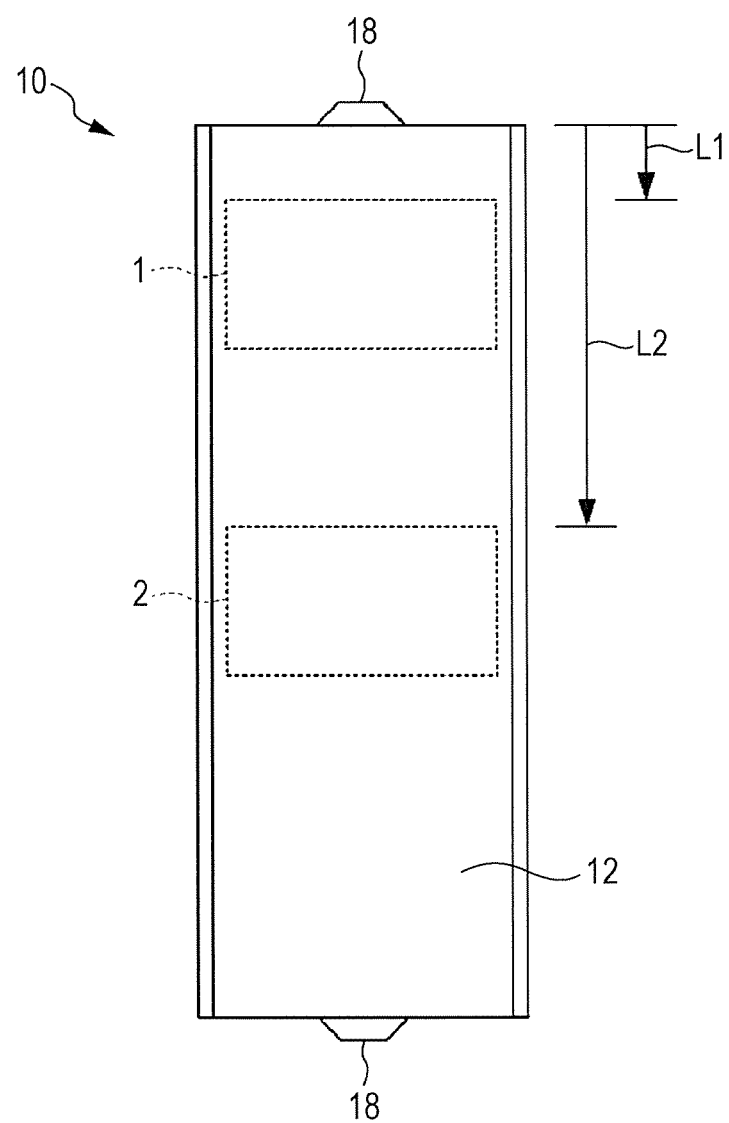
FIG. 7 is a diagram illustrating one example of display positions of information on a display screen.

FIG. 7 is a diagram illustrating one example of display positions of information on the display screen 12. The display position of the heading information detected in step S20 does not change every detection, and is displayed in a display region 1 disposed inside a predetermined range of the display screen 12 such that other information besides the heading information is also displayed on the display screen 12. Since the heading information does not actually include the content of the information, the heading information is information that does not need to be kept secret from other people who are not the user. Consequently, the CPU 21 displays the heading information in the display region 1 disposed at a position on the outer side of the wrist where the heading information may be viewed by other people.

Figure 8:
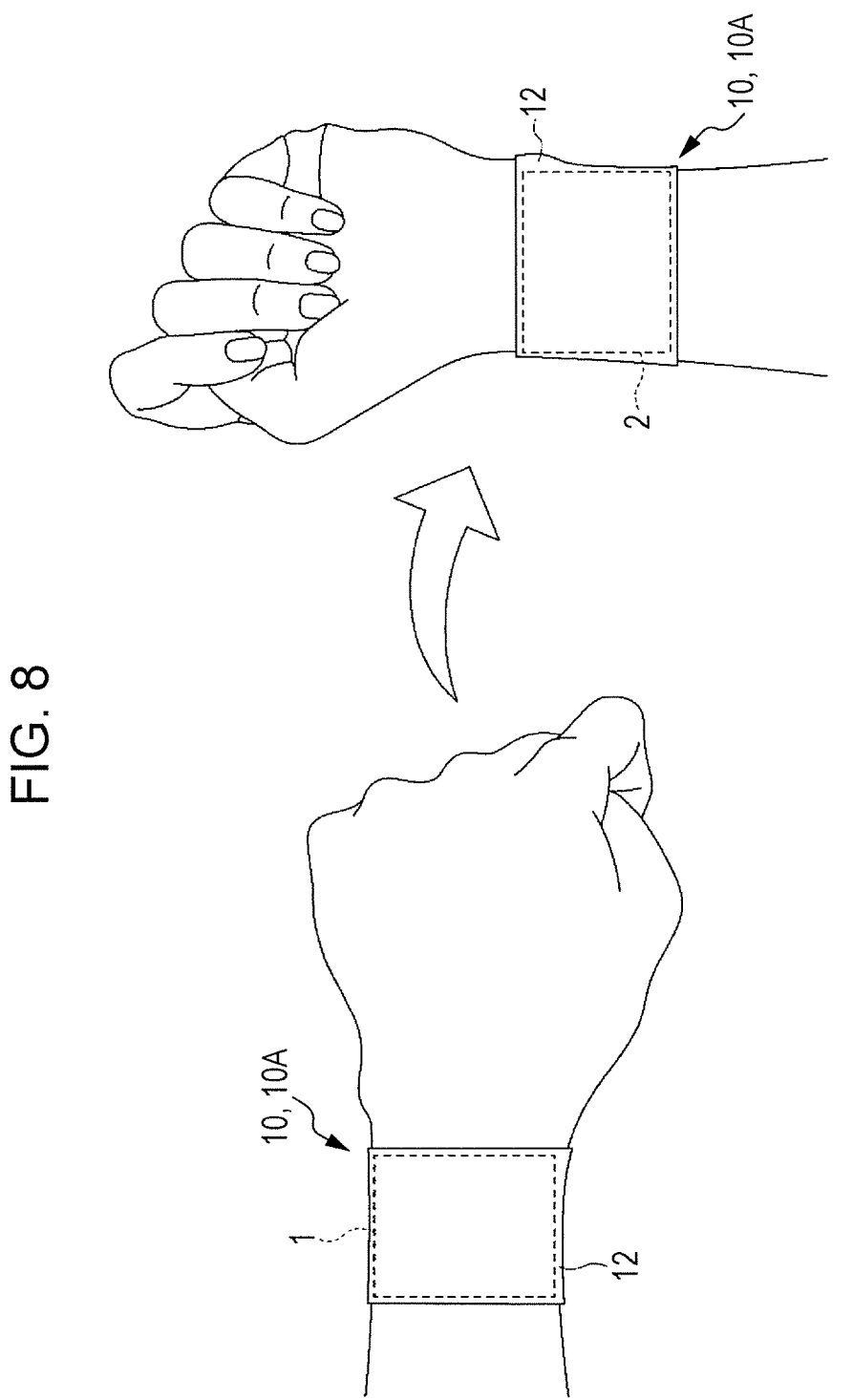
FIG. 8 is a diagram illustrating the relationship between display regions of information on the display screen and positions of the wrist.

The "outer side of the wrist" refers to a range of the wrist that is visible to other people in the state of stretching out the arm and placing the palm of the hand on the thigh. The display region 1 may be displayed at any position on the outer side of the wrist, but as illustrated in FIG. 8 for example, the display region 1 is assumed to be disposed in a range of the display screen 12 that is visible to the user in the case in which the user is wearing the wearable device 10 on one's wrist and is looking down on the back of the hand from above.

The range of the display screen 12 that becomes the outer side of the wrist varies depending on the position in the direction along the circumference of the wrist where the user has caused the clasps 18 of the wearable device 10 to engage, but in many cases the user has decided the position where the clasps 18 are to engage. Consequently, the CPU 21 disposes the display region 1 at a predetermined position as the range facing the outer side of the wrist.

In the display screen 12, the range facing the outer side of the wrist is set according to the distance from the position where the clasps 18 connect. As illustrated in FIG. 7, in the case of treating the start position of the range facing the outer side of the wrist in the display screen 12 as being a distance L1 along the circumferential direction of the wrist of the wearable device 10 from the position where the clasps 18 connect, the CPU 21 disposes the display region 1 at the position the distance L1 away from the position where the clasps 18 connect. With this arrangement, the display region 1 is disposed on the outer side of the wrist.

The distance L1 is set by the user who wears the wearable device 10, and the set distance L1 is stored in a predetermined area of the non-volatile memory 24 for example. Note that in the case in which the position of the display region 1 disposed in accordance with the distance L1 has shifted away from the outer side of the wrist, the user is able to adjust the distance L1, and the CPU 21 stores the adjusted distance L1 in the non-volatile memory 24 as a new distance L1.

The heading information displayed in the display region 1 is different for each type of event that occurs. FIGS. 9A to 9F are diagrams illustrating examples of heading information displayed in the display region 1.

Figure 9A:
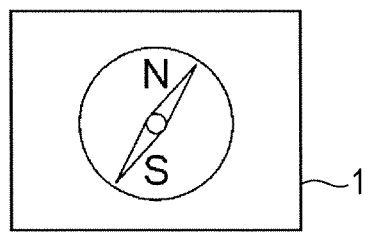
FIGS. 9A to 9F are diagrams illustrating examples of heading information displayed on the outer side of the wrist.

FIG. 9A is an example of heading information displayed in the case in which there is notifying information about a route to a preset destination. The route itself to the destination is not displayed in the display region 1, but an icon is displayed to remind the user that the notifying information is route-related information. As an example of the icon, in FIG. 9A an icon of a magnetic compass is displayed in the display region 1.

Figure 9D:
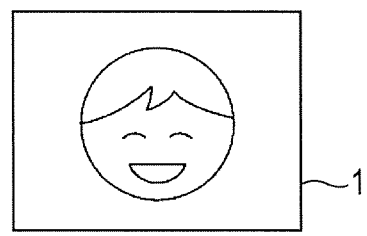
Figure 9B:
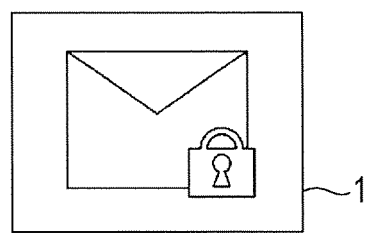

FIG. 9B is an example of heading information displayed in the case in which an email is received. The content of the email is not displayed in the display region 1, but an icon is displayed to remind the user that a received email exists. As an example of the icon, in FIG. 9B an icon of a lock and an email is displayed in the display region 1. Note that the lock icon is not displayed when an email is received, but is displayed in the case of determining that the received email contains secret information in step S40 described later.

Figure 9E:
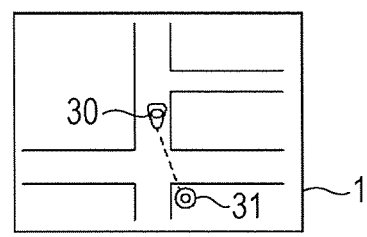
Figure 9C:
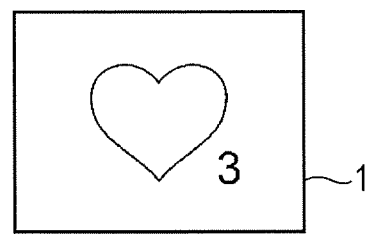

FIG. 9C is an example of heading information displayed in the case in which there is a "Like" response to an image or message that the user has posted to an SNS. Content specifying who has responded with a "Like" is not displayed in the display region 1, but an icon is displayed to remind the user that the notifying information is information related to an SNS response. As an example of the icon, in FIG. 9C an icon of a heart symbol and a numeral expressing the number of people who responded with a "Like" are displayed in the display region 1.

FIG. 9D is an example of heading information displayed in the case in which a message is received in a messenger application for exchanging messages using text and images in real-time. The content of the message is not displayed in the display region 1, but an icon is displayed to remind the user that a received message exists. As an example of the icon, in FIG. 9D an icon illustrating a person's face is displayed in the display region 1.

FIG. 9E is a diagram illustrating an example of heading information displayed to remind the user of the purpose or the like of a visit in the case in which the user comes within a predetermined range of a destination 31 to visit. Content specifying the location and purpose of the visit, such as a company name, a building name, and a person in charge to visit and the purpose of the visit, is not displayed in the display region 1, but an icon is displayed to remind the user that the user has approached the destination 31. As an example of the icon, in FIG. 9E, the user's current location 30 and the destination 31 displayed on a map of streets only for example are displayed in the display region 1.

Note that the reminder heading information related to a visit is not necessarily required to be map information, and may also be simply an icon informing the user that the user has come within a predetermined range of the destination 31 to visit.

Figure 9F:
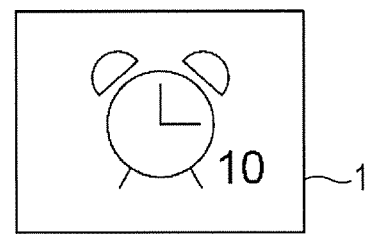

FIG. 9F is a diagram illustrating an example of heading information displayed to remind the user of a schedule in the case in which the current time approaches a scheduled time that the user has set in advance. The content of the schedule is not displayed in the display region 1, but an icon is displayed to remind the user that the scheduled time is near. As an example of the icon, in FIG. 9F an icon of a clock and a numeral indicating the remaining time until the scheduled start in units of minutes for example are displayed in the display region 1.

Note that in the case of displaying heading information in the display region 1, the CPU 21 may activate a vibrator not illustrated connected to the I/O 25 to notify the user that heading information is displayed in the display region 1.

In step S40, the CPU 21 determines whether or not the content of the information expressed by the heading information is secret information. The "content of the informa-tion expressed by the heading information" is the content of the event whose occurrence is indicated in the notification by the heading information.

Also, "secret information" refers to information that the user does not want other people to see, and is information that would result in loss of an advantage to the user if seen by another person without the user's permission. Secret information includes personal information related to the user and the user's family or other relations, such as information related to an activity schedule, information related to acquaintances, information related to finances, information related to hobbies and interests, and information related to illness and the body.

In the case in which a word preregistered as secret information is included in the information expressed by the heading information, for example, the CPU 21 determines that secret information is included in the content of the information. The words treated as secret information are registered, corrected, and deleted by the user, and are stored in the non-volatile memory 24, for example.

Note that even in the case in which a word treated as secret information is not included in the content of the information expressed by the heading information, the CPU 21 may also be configured to determine secret information or not in combination with other determination criteria.

For example, in the case in which the event that has occurred is the receiving of an email, the receiving of SNS information, or the receiving of a message by a messenger application, the CPU 21 determines that the received content is secret information if the sender of the email, SNS information, or message is a sender preregistered by the user. Also, in the case in which the content of the information expressed by the heading information contains a meaningless arrangement of letters and numbers different from the display format of a phone number or the display format of an email address, it is conceivable that the arrangement of letters and numbers expresses a password, and therefore the CPU 21 determines that the arrangement of letters and numbers is secret information even without being registered by the user. As the technique by which the CPU 21 analyzes the context of information and autonomously determines whether or not the information contains secret information in this way, a publicly available context analysis technique such as morphological analysis is applied, for example.

In the case in which the content of the information expressed by the heading information is secret information, the flow proceeds to step S50. Note that in the case in which the content of the information expressed by the heading information is secret information, a vibrator not illustrated connected to the I/O 25 may be activated to notify the user that secret information related to the heading information exists.

In step S50, the CPU 21 determines whether or not a viewing operation of viewing the display region 2 which is different from the display region 1 of the display screen 12 and which is disposed at a position on the inner side of the wrist has been detected.

Herein, the "inner side of the wrist" refers to a range of the wrist that is not visible to other people in the state of stretching out the arm and placing the palm of the hand on the thigh. The display region 2 may be displayed at any position on the inner side of the wrist, but as illustrated in FIG. 8 for example, the display region 2 is assumed to be disposed in a range of the display screen 12 that is visible to the user in the case in which the user is wearing the wearable device 10 on one's wrist with the palm upward, and is stretching out one's arm at an angle intersecting the front of the body.

Specifically, as illustrated in FIG. 7, in the case of treating the start position of the range facing the inner side of the wrist in the display screen 12 as being a distance L2 along the circumferential direction of the wrist of the wearable device 10 from the position where the clasps 18 connect, the CPU 21 disposes the display region 2 at the position the distance L2 away from the position where the clasps 18 connect. With this arrangement, the display region 2 is disposed on the inner side of the wrist.

The distance L2 is set by the user who wears the wearable device 10, and the set distance L2 is stored in a predetermined area of the non-volatile memory 24 for example. Note that in the case in which the position of the display region 2 disposed in accordance with the distance L2 has shifted away from the inner side of the wrist, the user issues an instruction to change the distance L2 to the wearable device 10 via the input unit 5. The CPU 21 receives the change instruction, and stores the changed distance L2 in the non-volatile memory 24 as a new distance L2.

Note that the method of setting the positions at which to dispose the display region 1 and the display region 2 is not limited to the above. For example, a biological sensor not illustrated that is attached along the circumferential direction of the wrist with respect to the contact face of the display screen 12 of the wearable device 10 may be used to detect the position of the outer side of the wrist and the position of the inner side of the wrist, and dispose the display region 1 and the display region 2 on the display screen 12.

The position on the wrist where the clasps 18 are engaged is roughly predetermined by the user in many cases, but the wearable device 10 is not limited to being worn with the clasps 18 in the same position on the wrist every time. In other words, the positions of the display region 1 and the display region 2 with respect to the wrist tend to vary every time the wearable device 10 is worn on the wrist. Consequently, in the case of a wearable device 10 in which a biological sensor is connected to the I/O 25, the CPU 21 uses the biological sensor every time the user puts on the wearable device 10 to detect the position of the outer side of the wrist and the position of the inner side of the wrist on the display screen 12, and disposes the display region 1 and the display region 2 on the display screen 12.

Since the radial artery passes underneath the skin on the inner side of the arm near the wrist, a stronger pulse is detected compared to other locations along the circumferential direction of the arm. The biological sensor detects the strength of the pulse at locations along the circumferential direction of the wrist, and notifies the CPU 21 of the pulse strength at each location together with identification information expressing the location. The CPU 21 receives the pulse strengths and the identification information expressing the locations from the biological sensor, acquires the strongest pulse from among the received pulse strengths, and from the identification information expressing the location associated with the acquired pulse, specifies the detection position where the strongest pulse has been detected on the display screen 12. The CPU 21 disposes the display region 2 in a range of the display screen 12 corresponding to the position where the strongest pulse was detected, and disposes the display region 1 in a range of the display screen 12 opposite the display region 2 with the user's wrist in between.

With this arrangement, the display region 1 is disposed on the outer side of the arm, and the display region 2 is disposed on the inner side of the arm.

When secret information is displayed in the region on the inner side of the arm on the display screen 12, the secret information is less likely to enter the field of view of other people compared to the case of being displayed on the outer side of the arm. Consequently, the secret information preferably is displayed in the region on the inner side of the arm on the display screen 12. However, in the case of displaying secret information in the display region 2 without an instruction from the user, since the secret information is displayed in the display region 2 without the user noticing, even if the location where the secret information is displayed is on the inner side of the arm, depending on the direction of the arm and the like, the secret information conceivably may enter the field of view of other people.

Consequently, after displaying the heading information in the display region 1, the CPU 21 detects a viewing operation by which the user views the display region 2 disposed on the inner side of the arm, and thereby determines that the user has given an instruction to display the secret information.

Figure 10:
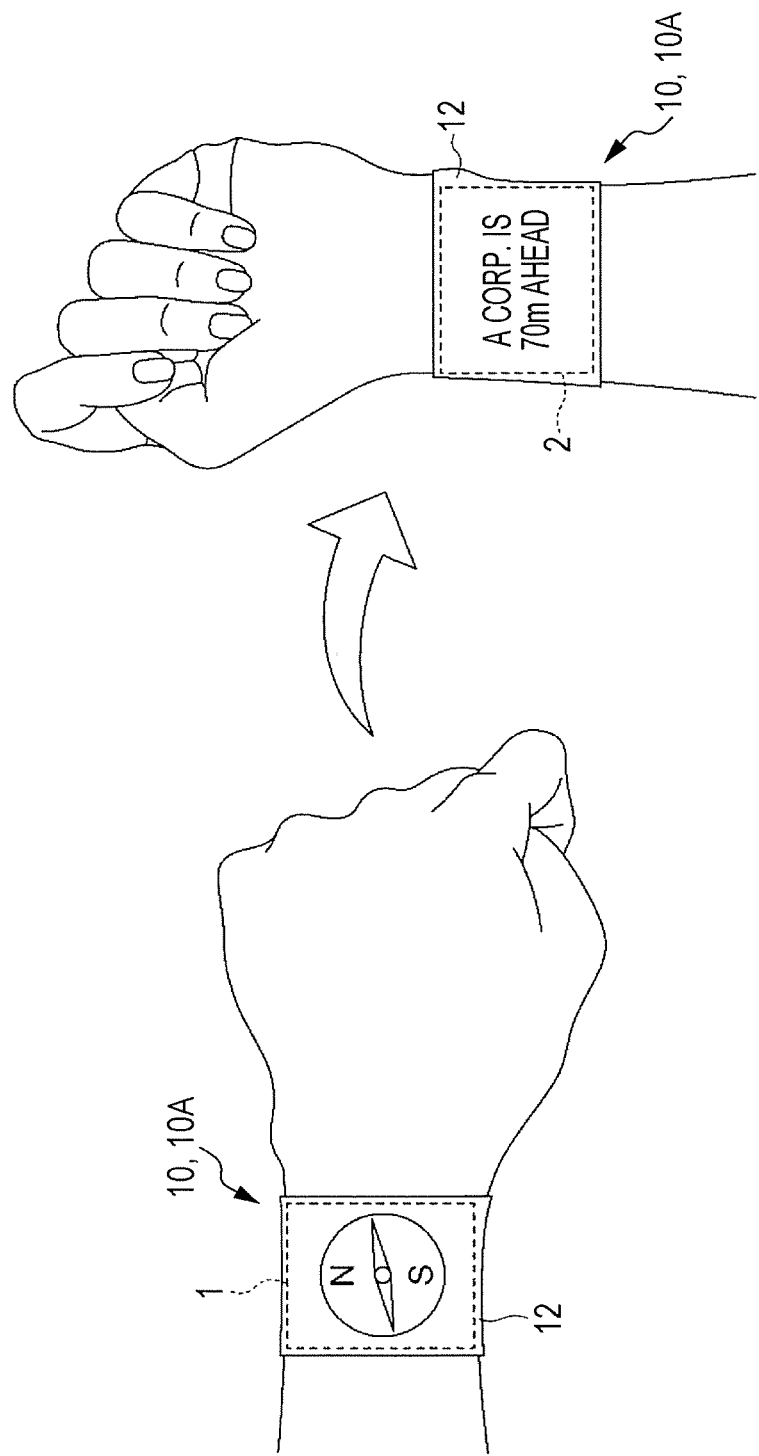
FIG. 10 is a diagram illustrating an example of a wrist motion.

FIG. 10 is a diagram illustrating an example of an arm motion by which the user views the display region 2 from the display region 1. As illustrated in FIG. 10, in order to view the display region 2, the user stretches out the arm wearing the wearable device 10 at an angle intersecting the front of the body with the palm facing upward, such that the display region 2 enters the user's field of view.

Consequently, it is sufficient for the CPU 21 to determine that the user has performed the viewing operation from the movement amount and the rotation amount of the arm, for example. If the movement amount of the arm and the rotation amount of the arm measured by the motion sensor 8 are values inside a range (viewing operation range) measured in the case in which the user stretches out the arm wearing the wearable device 10 at an angle intersecting the front of the body with the palm facing upward, the CPU 21 determines that the user has performed the viewing operation. The viewing operation range for the movement amount of the arm and the rotation amount of the arm is computed in advance by experiment with an actual wearable device 10, computer simulation based on the design specifications of the wearable device 10, or the like, and is stored in the non-volatile memory 24, for example. Note that the CPU 21 may also receive an instruction to change the viewing operation range from the user, and change the viewing operation range.

In the case of determining that the user has performed a viewing operation of viewing the display region 2, the flow proceeds to step S60.

In step S60, the CPU 21 controls the display unit 6 to display secret information related to the heading information displayed in the display region 1 in step S30 in the display region 2.

FIGS. 11A to 11F are diagrams illustrating examples of secret information displayed in the display region 2.

Figure 11A:
FIGS. 11A to 11F are diagram illustrating examples of secret information displayed on the inner side of the wrist.

FIG. 11A is an example of secret information with respect to the heading information illustrated in FIG. 9A, in which the route to a destination is displayed. The route to the destination is one example of information related to the user's activity schedule, and since there is a risk that the user's hobbies and interests, companies that the user has a connection with, and the like may be specified from locations that the user visits, such information is treated as secret information.

Figure 11B:
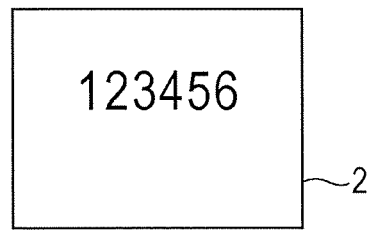

FIG. 11B is an example of secret information with respect to the heading information illustrated in FIG. 9B, in which the content of an email including personal information such as a password for example is displayed. Since there is a risk of resulting in loss of an advantage to the user if personal information such as a password is leaked to other people, such information is treated as secret information.

Figure 11C:
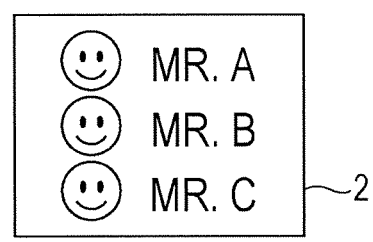

FIG. 11C is an example of secret information with respect to the heading information illustrated in FIG. 9C, in which the names of people who responded with a "Like" to information that the user posted to an SNS are displayed. Information about the persons who responded with a "Like" is one example of information related to acquaintances, and since there is a risk that persons having a connection to the user may be specified, such information is treated as secret information.

Figure 11D:
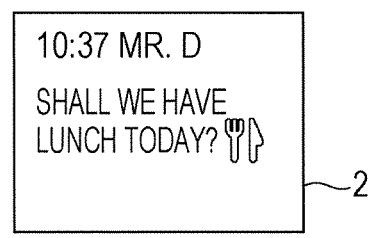

FIG. 11D is an example of secret information with respect to the heading information illustrated in FIG. 9D, in which the content of a message received using a messenger application is displayed. Since there is a risk that an activity schedule, such as when and where and with whom the user is going to meet for example, may be specified from a message of a messenger application, such information is treated as secret information.

Figure 11E:

FIG. 11E is an example of secret information with respect to the heading information illustrated in FIG. 9E, in which details about a visit with a stated purpose or the like are displayed. Since there is a risk that information such as when and where, with whom, and for what purpose the user is going to meet may be specified from details about a visit, such information is treated as secret information.

Figure 11F:
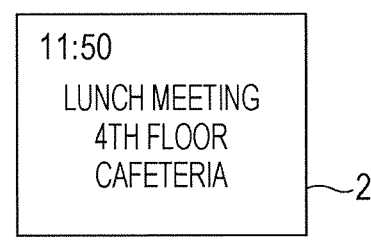

FIG. 11F is an example of secret information with respect to the heading information illustrated in FIG. 9F, in which the content of a schedule is displayed. Since there is a risk that information such as when and where and with whom the user is going to meet may be specified from the content of a schedule, such information is treated as secret information.

As described above, when the user views the display region 2, in many cases the user stretches out the arm wearing the wearable device 10 at an angle intersecting the front of the body with the palm facing upward as illustrated in FIG. 10, because this allows the user to look at the inner side of the arm without adopting an unreasonable posture. On the other hand, when the user views the display region 1, the user is able to look at the outer side of the arm with a more natural posture by stretching out the arm wearing the wearable device 10 across the front of the body in the horizontal direction with the back of the hand facing upward, as illustrated in FIG. 10.

In other words, the user takes different postures between the case of viewing the display region 1 and the case of viewing the display region 2. Consequently, the display direction of the secret information displayed in the display region 2 and the display direction of the heading information displayed in the display region 1 are displayed in different directions by the CPU 21. Herein, the "display direction of the secret information" refers to the direction following the vertical direction of the secret information, and the "vertical direction of the secret information" refers to the direction following the vertical direction of the letters and figures included in the secret information. Also, the "display direction of the heading information" refers to the direction following the vertical direction of the heading information, and the "vertical direction of the heading information" refers to the direction following the vertical direction of the letters and figures included in the heading information.

Figure 12:
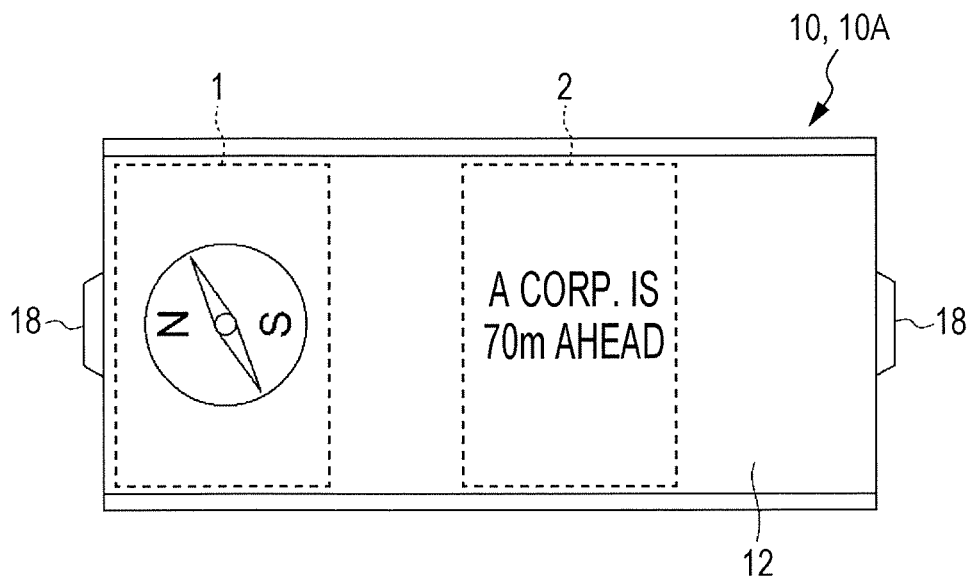
FIG. 12 is a diagram illustrating one example of the display directions of information displayed on the display screen.

FIG. 12 is a diagram illustrating one example of the display directions of information displayed on the display screen 12.

As illustrated in FIG. 12, in the display region 1, the CPU 21 controls the display unit 6 to display the heading information with the vertical direction matched to the circumferential direction of the arm of the wearable device 10, such that the vertical direction of the heading information and the vertical direction of the user's field of view become the same in the state in which the user stretches out the arm wearing the wearable device 10 across the front of the body in the horizontal direction with the back of the hand facing upward.

Also, in the display region 2, the CPU 21 controls the display unit 6 to display the secret information with the vertical direction matched to the direction orthogonal to the circumferential direction of the arm of the wearable device 10, such that the vertical direction of the secret information and the vertical direction of the user's field of view become the same in the state in which the user stretches out the arm wearing the wearable device 10 at an angle intersecting the front of the body with the palm facing upward.

In other words, on the display screen 12, the display direction of the secret information displayed in the display region 2 is displayed orthogonally to the display direction of the heading information displayed in the display region 1.

Note that the CPU 21 is not necessarily required to display the display direction of the heading information and the display direction of the secret information orthogonally on the display screen 12, and may also be configured to adjust the display direction of the secret information according to the angle obtained between the arm and the front of the body. For example, in the case in which the angle obtained between the arm and the front of the body is 45 degrees, if the angle obtained between the display direction of the heading information and the display direction of the secret information is set to 45 degrees, the vertical direction of the secret information points in the same direction as the vertical direction of the user's field of view. Consequently, the secret information is easier to view compared to the case of making the display direction of the secret information orthogonal to the display direction of the heading information. Accordingly, in the case in which the angle obtained between the arm and the front of the body is 45 degrees, the CPU 21 adjusts the display direction of the secret information in the display region 2 such that the angle obtained between the display direction of the heading information and the display direction of the secret information is 45 degrees.

On the other hand, in the determination process of step S50, in the case of determining that the user has not performed a viewing operation of viewing the display region 2, the flow proceeds to step S70.

Depending the user, there may be someone who wants to display and check information in the display region 1 facing the outer side of the arm even if the information is secret information because no one else is nearby, for example. Consequently, in step S70, the CPU 21 determines whether or not an operation of the user pressing the display region 1 has been detected through touch panel as one example of the input unit 5.

In the case of detecting the operation of pressing the display region 1, since the operation is taken to be a declaration of intent by the user of wanting to check secret information in the display region 1, the CPU 21 proceeds to step S90, and in step S90, displays the secret information in the display region 1.

On the other hand, in the case of not detecting the operation of pressing the display region 1, the flow proceeds to step S50. In other words, the CPU 21 repeatedly executes the determination processes of steps S50 and S70 until the user performs the viewing operation of viewing the display region 2 or the operation of pressing the display region 1. In the repetition of these determination processes, the secret information is displayed in the display region 2 in the case of detecting that the user has performed the viewing operation of viewing the display region 2, and the secret information is displayed in the display region 1 in the case of detecting that the user has performed the operation of pressing the display region 1.

Also, in the case in which the determination process of step S40 determines that the content of the information expressed by the heading information displayed in the display region 1 is not secret information, displaying the content of the information expressed by the heading information without an instruction from the user does not result in loss of an advantage to the user. Consequently, the flow proceeds to step S80, and the CPU 21 determines whether or not a predetermined stipulated time has elapsed. If the stipulated time has not elapsed, the determination process of step S80 is repeatedly executed to monitor the elapse of the stipulated time. On the other hand, if the stipulated time has elapsed, the flow proceeds to step S90.

In the case of proceeding from step S80 to S90, in step S90, the CPU 21 displays the content of the information expressed by the heading information in the display region 1. In other words, by not proceeding to step S90 until the stipulated time elapses, for the duration of the stipulated time, the heading information continues to be displayed in the display region 1, and after that, the display is switched to the content of the information expressed by the heading information. With this arrangement, time for the user to look at the heading information and check what type of event has occurred is secured.

With the above, the display process illustrated in FIG. 6 ends. Note that in the case in which a predetermined operation of discontinuing the display of secret information is performed on the wearable device 10, the CPU 21 may also end the display process illustrated in FIG. 6 without displaying the secret information in the display screen 12. In the case of receiving an instruction to display the secret information from the user, the CPU 21 displays the secret information whose display was discontinued in a region of the display screen 12 specified by the instruction. Since the user already knows that the information to be displayed on the display screen 12 is secret information, it is sufficient for the user to cause the secret information to be displayed in a region of the display screen 12 that does not enter the field of view of other people.

In the case in which the wearable device 10 is the pendant-style wearable device 10 illustrated in FIG. 3, the display process illustrated in FIG. 6 is performed by associating the display region 1 with the display screen 12A and associating the display region 2 with the display screen 12B. In other words, the display screen 12A is disposed on the outer side of the arm, while the display screen 12B is disposed on the inner side of the arm.

However, for a wearable device 10 using a flexible display, the positions of the display region 1 and the display region 2 are set by the CPU 21, but in the case of a pendant-style wearable device 10, the user moves the display screen 12A and the display screen 12B on the belt 19 to set the display region 1 on the outer side of the arm and the display region 2 on the inner side of the arm.

In the display process described above, information that relates to the information displayed in the display region 1 is displayed in the display region 2, but information that does not related to the information displayed in the display region 1 may also be displayed in the display region 2.

For example, the content of secret information may be displayed in the display region 2 while continuing to display time information in the display region 1.

Specifically, in the case of logging in to a web page that provides a specific services to use a desired service, the user is prompted to input a preregistered password. However, if the desired service is not a service used from day to day, the user may have forgotten the password. For this reason, one use case is to store the password in advance in the non-volatile memory 24 of the wearable device 10, and cause the password to be displayed on the display screen 12 when appropriate to input the password into the web page. In such a case, the password is made to be displayed in the display region 2 in accordance with a user instruction.

Note that in the wearable device 10, not only passwords but also secret information such as phone numbers, addresses, email addresses, and user IDs may also be displayed in the display region 2 according to user instructions.

Furthermore, in a situation in which a web page is being displayed in the display region 1, if the user performs a viewing operation of viewing the display region 2, the CPU 21 may also cause a password for logging in to the web page being displayed in the display region 1 to be displayed in the display region 2. The password to display in the display region 2 is acquired by referencing a table associating the Uniform Resource Locator (URL) of the web page and the password in advance and stored in the non-volatile memory 24.

Also, in the case in which a biological sensor provided in the wearable device 10 is utilized and the user performs the viewing operation of viewing the display region 2, biological information (for example, heart rate or blood pressure) preset by the user may be displayed in the display region 2 irrespectively of the information being displayed in the display region 1.

Figure 13:
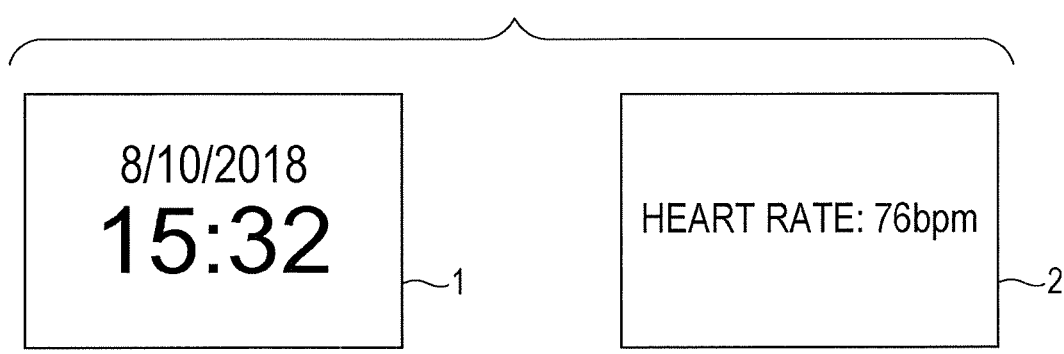
FIG. 13 is a diagram illustrating an example of displaying unrelated pieces of information in respective display regions.

FIG. 13 is a diagram illustrating one example of displaying time information in the display region 1 and the heart rate in the display region 2.

In this way, with the wearable device 10 according to the present exemplary embodiment, after displaying information that does not need to be kept secret in the display region 1, if a viewing operation of the user viewing the display region 2 is detected, secret information is displayed in the display region 2. In other words, in the wearable device 10 according to the present exemplary embodiment, secret information is displayed in a region on the inner side of the arm of the display screen 12.

Second Exemplary Embodiment

In the wearable device 10 according to the first exemplary embodiment, heading information is displayed in the display region 1 at the timing of detecting information to notify the user about, while in addition, secret information is displayed in the display region 2 at the timing of detecting the viewing operation of viewing the display region 2. However, the timings at which to display information on the display screen 12 are not limited to the above example.

The second exemplary embodiment describes a wearable device 10A that displays information on the display screen 12 in the case in which the possibility that the information to notify the user about will be seen by other people is considered to be low compared to other display timings.

Figure 14:
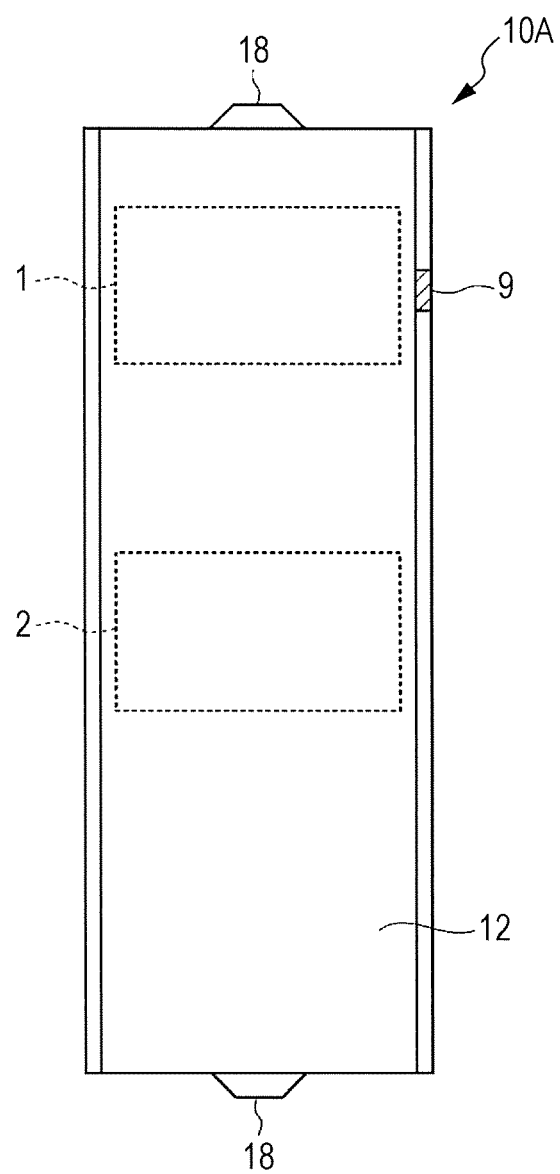
FIG. 14 is a diagram illustrating an exemplary exterior appearance of a wearable device provided with a camera.

The exemplary functional configuration of the wearable device 10A is the same as the exemplary functional configuration of the wearable device 10 according to the first exemplary embodiment illustrated in FIG. 2, but as illustrated in FIG. 14, a camera 9 is embedded into the bezel of the wearable device 10A adjacent to the display region 1 on the display screen 12. The lens of the camera 9 is attached to the face on the same side as the information display face of the display screen 12, and takes an image of the face of the user viewing the display region 1. The camera 9 is one example of an image-taking device according to the present exemplary embodiment.

Figure 15:
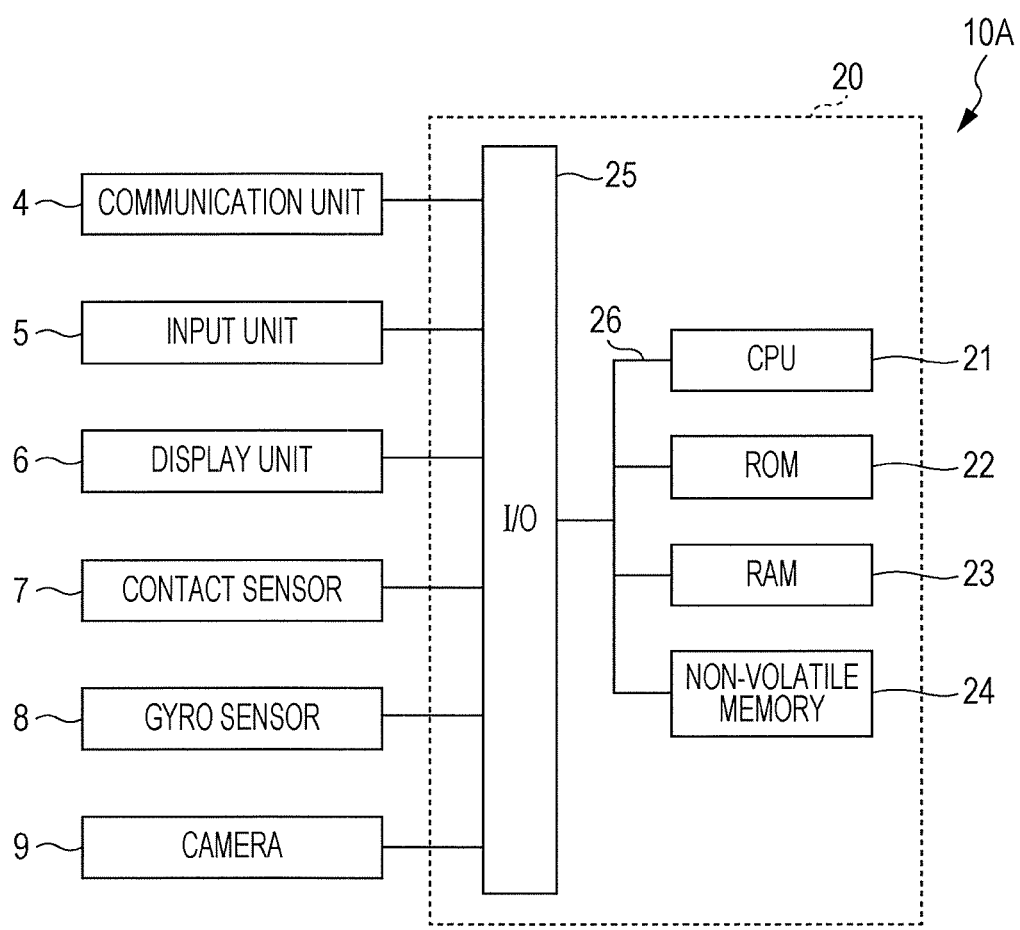
FIG. 15 is a diagram illustrating an exemplary schematic configuration of the electrical system in the wearable device according to a second exemplary embodiment.

FIG. 15 is a diagram illustrating an exemplary schematic configuration of the electrical system in the wearable device 10A. The exemplary schematic configuration of the electrical system illustrated in FIG. 15 is different from the exemplary schematic configuration of the electrical system in the wearable device 10 illustrated in FIG. 5 in that the camera 9 is connected to the I/O 25, but otherwise is the same as the wearable device 10.

Figure 16:
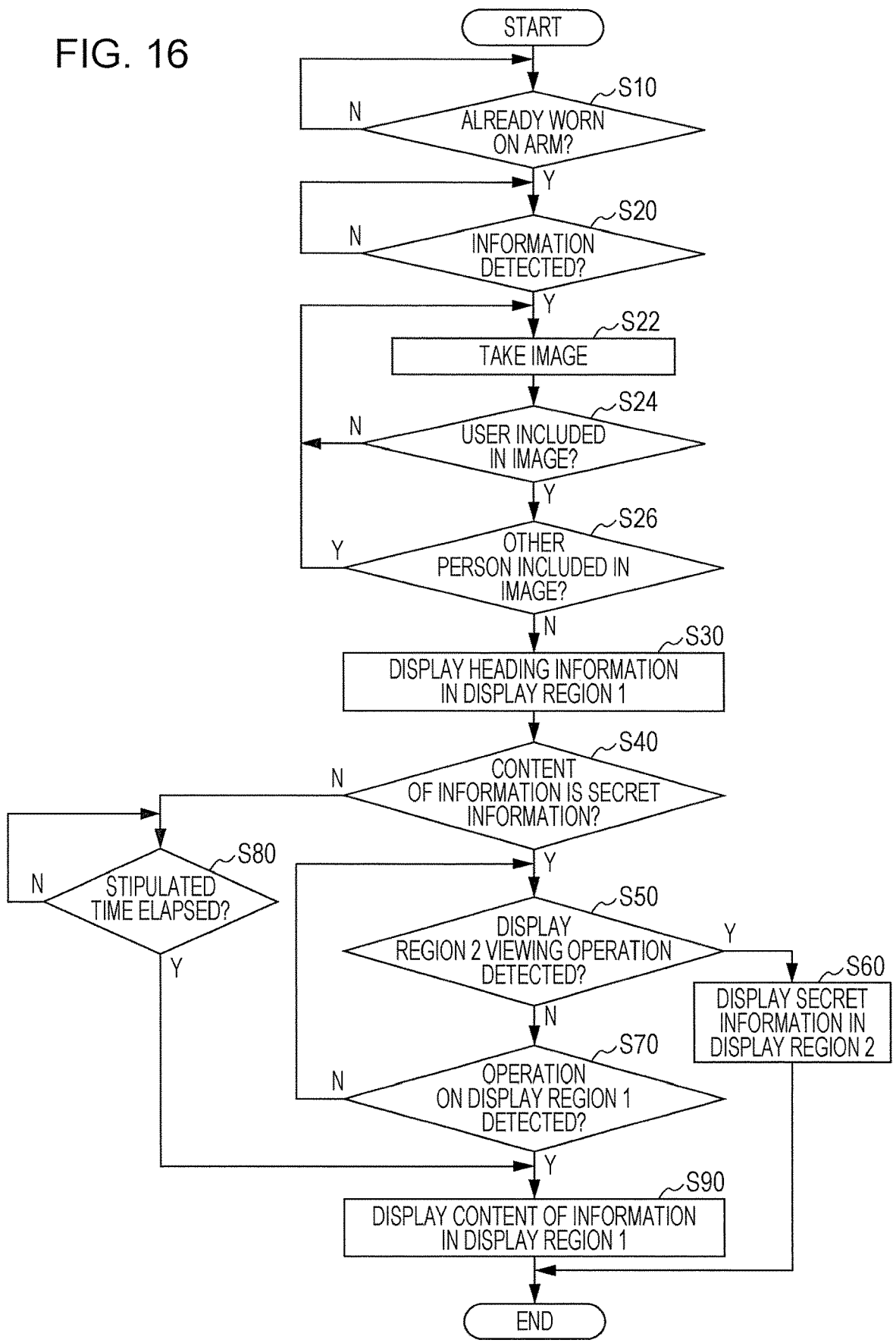
FIG. 16 is a flowchart illustrating one example of the flow of a display process according to the second exemplary embodiment.

Next, FIG. 16 will be referenced to describe operations of the wearable device 10A according to the present exemplary embodiment.

FIG. 16 is a flowchart illustrating one example of the flow of a display process executed by the CPU 21 in the case in which the power source of the wearable device 10A is set to on and the wearable device 10A boots up.

A control program that stipulates the display process is stored in advance in the ROM 22 of the wearable device 10A for example. The CPU 21 of the wearable device 10A loads the control program stored in the ROM 22 and executes the display process.

A wearable device 10A in which a flexible display is used for the display screen 12 is described herein, but a similar process is applied to a pendant-style wearable device 10A.

The display process of the wearable device 10A illustrated in FIG. 16 is different from the display process of the wearable device 10 illustrated in FIG. 6 in that steps S22, S24, and S26 have been added, but otherwise is the same as the display process in FIG. 6.

Step S22 is executed in the case of detecting information notifying the user of the occurrence of an event in step S20.

In step S22, the CPU 21 controls the camera 9 to take an image, and stores the taken image in the RAM 23. The taken image may be a moving image or a still image, but herein an example of taking a still image will be described.

In step S24, the CPU 21 determines whether or not the user's face is included in the image taken in step S22. The determination of whether or not the user's face is included in the image is performed using publicly available face authentication technology or pattern matching. As one example, a reference image of the user's face is stored in the non-volatile memory 24 in advance. Furthermore, it is sufficient to extract the features of objects from the image taken in step S22, and in the case in which the differences between the extracted features and the features of the user's face included in the reference image fall within a predetermined range, determine that the user's face is included in the image taken in step S22.

In the case in which the user's face is not included in the image taken in step S22, the flow proceeds to step S22 and an image is taken again. On the other hand, in the case in which the user's face is included in the image taken in step S22, the flow proceeds to step S26.

In step S26, the CPU 21 determines whether or not the face of another person other than the user is included in the image taken in step S22. The determination of whether or not the face of another person other than the user is included in the image taken in step S22 is performed using publicly available face authentication technology or pattern matching, similarly to step S24. Specifically, it is sufficient to use publicly available face authentication technology for example to extract the faces of persons from the image taken in step S22, and if multiple faces are extracted, determine that the face of another person other than the user is included.

In the case in which the face of another person other than the user is included in the image taken in step S22, the flow proceeds to step S22 and an image is taken again. On the other hand, in the case in which the face of another person other than the user is not included in the image taken in step S22, the flow proceeds to step S30 and the heading information is displayed in the display region 1.

In other words, the case in which the user's face is not included in the image taken by the camera 9 means that the display region 1 is not facing towards the user. In the case of displaying the heading information in the display region 1 in this state, even though the information is heading information that does not include secret information, there is still a risk of the information being seen by other people, and therefore the wearable device 10 is configured not to display the heading information in the display region 1 as a precaution.

Also, even in the case in which the user's face is included in the image taken by the camera 9, in situations such as when another person is behind the user for example, there is a risk that heading information displayed in the display region 1 will be seen by other people. Consequently, in the case in which the face of another person other than the user is included in the image taken by the camera 9, the wearable device 10A is configured not to display the heading information in the display region 1.

Thereafter, the processes in steps S40 to S90 described in FIG. 6 are executed, secret information related to the heading information is displayed in the display region 2, and the display process illustrated in FIG. 16 ends.

Herein, as one example, an image is used to control the timing at which to display heading information in the display region 1, but an image may also be used to control the timing at which to display secret information in the display region 2.

Figure 17:
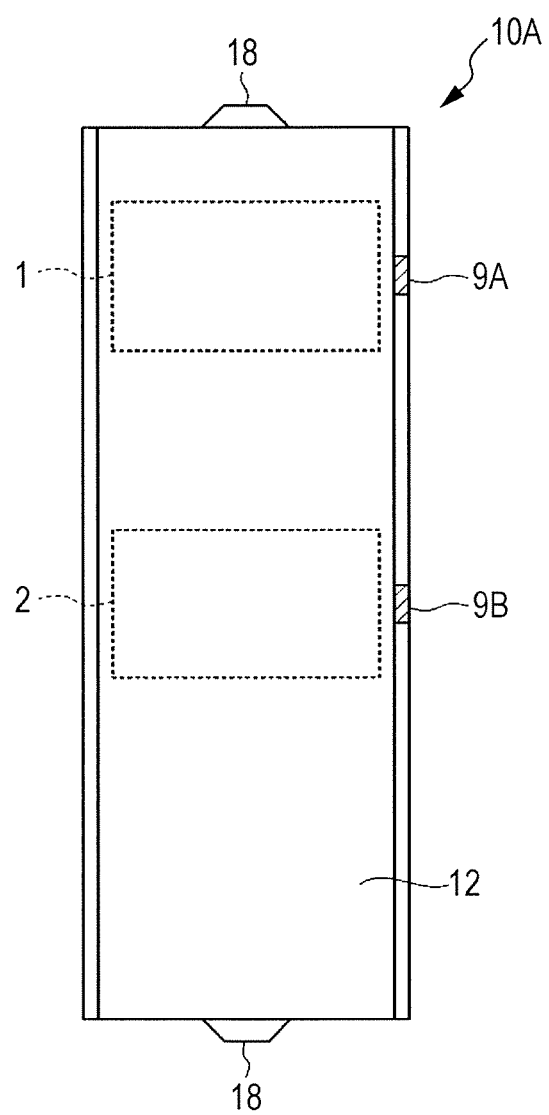
FIG. 17 is a diagram illustrating an exemplary exterior appearance of a wearable device provided with multiple cameras.

FIG. 17 is a diagram illustrating an example of a wearable device 10A used in a display process that uses an image to control the timing at which to display secret information in the display region 2.

In the bezel adjacent to the display region 1 on the display screen 12 of the wearable device 10A illustrated in FIG. 17, a camera 9A corresponding to the camera 9 of the wearable device 10A illustrated in FIG. 14 is embedded, and in the bezel adjacent to the display region 2, a camera 9B is embedded. Note that in the same way as the camera 9A, the lens of the camera 9B is attached to the face on the same side as the information display face of the display screen 12.

In the case of using the wearable device 10A illustrated in FIG. 17 to execute the display process illustrated in FIG. 16, between step S50 and step S60, processes which are the same as steps S22 to S26 are executed using an image taken by the camera 9B.

Specifically, after determining in step S50 that the viewing operation of viewing the display region 2 has been detected, the CPU 21 controls the camera 9B to take an image, and determines whether or not the user's face including the eyes is included in the taken image.

Additionally, the CPU 21 uses publicly available gaze detection technology to determine whether or not the user's gaze is pointing at the display region 2. The user's gaze being pointed at the display region 2 means that the user is viewing the display region 2. Consequently, not only is the viewing operation confirmed by the movement amount and rotation amount of the arm, but the user is also confirmed to perform the viewing operation from an image.

Furthermore, the CPU 21 determines whether or not the face of another person other than the user is included in the image taken by the camera 9B, and if the face of another person other than the user is not included, the flow proceeds to step S60 and secret information related to the heading information is displayed in the display region 2.

On the other hand, in the case in which the face of the user viewing the display region 2 is not included in the image taken by the camera 9B, or in the case in which the face of another person other than the user is included in the image taken by the camera 9B, images are taken by the camera 9B and the situation of the user and other people is monitored until the face of the user viewing the display region 2 is included and the face of another person other than the user is not included in the image.

Herein, an example of detecting a viewing operation from the user's gaze in addition to detecting the operation of viewing the display region 2 by the movement amount and the rotation amount of the arm is described, but the presence or absence of the viewing operation may also be detected from the user's gaze alone.

In the case in which the wearable device 10A is a pendant-style wearable device 10A as illustrated in FIG. 3, it is sufficient to embed the camera 9A in the bezel of the display screen 12A, embed the camera 9B into the bezel of the display screen 12B, and execute the display process described in the present exemplary embodiment.

In this way, with the wearable device 10A according to the present exemplary embodiment, information is displayed in the display region 1 and the display region 2 at timings when only the user is viewing the display region 1 and the display region 2. Consequently, compared to the case of displaying information on the display screen 12 without using an image to check the behavior of the user and other people, the secrecy of the information displayed on the display screen 12 is improved.

Modification 1 of Second Exemplary Embodiment

In the wearable device 10A described above, the viewing operation of the user viewing the display region 2 is detected, and in the case in which only the user's face is included in the camera 9B provided adjacently to the display region 2, secret information is displayed in the display region 2.

At this point, a wearable device 10A will be described in which secret information is displayed in a region on the display screen 12 being viewed by the user, without limiting the region in which to display secret information to a specific region.

Figure 18:
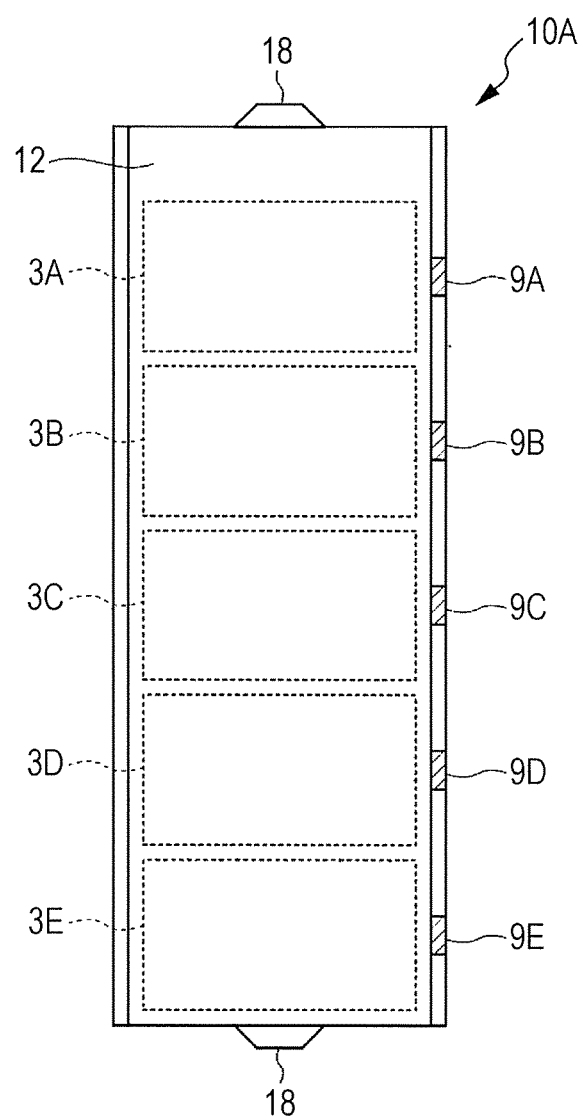
FIG. 18 is a diagram illustrating an exemplary exterior appearance of a wearable device according to Modification 1 of the second exemplary embodiment.

FIG. 18 is a diagram illustrating an exemplary exterior appearance of the wearable device 10A according to the present exemplary modification. The display screen 12 of the wearable device 10A is divided into multiple regions 3A to 3E, and cameras 9A to 9E are embedded in the bezel of the wearable device 10A adjacent to each of the regions 3A to 3E, respectively. Note that the lenses of the cameras 9A to 9E are attached to the face on the same side as the information display face of the display screen 12. In the following, the cameras 9A to 9E will be collectively designated the "cameras 9", and the multiple regions 3A to 3E will be collectively designated the "regions 3".

The number of divisions into regions on the display screen 12 is one example, and the number of divisions into regions is not restricted. The number of cameras 9 provided in the wearable device 10A also increases or decreases in coordination with the number of divisions into regions.

Figure 19:
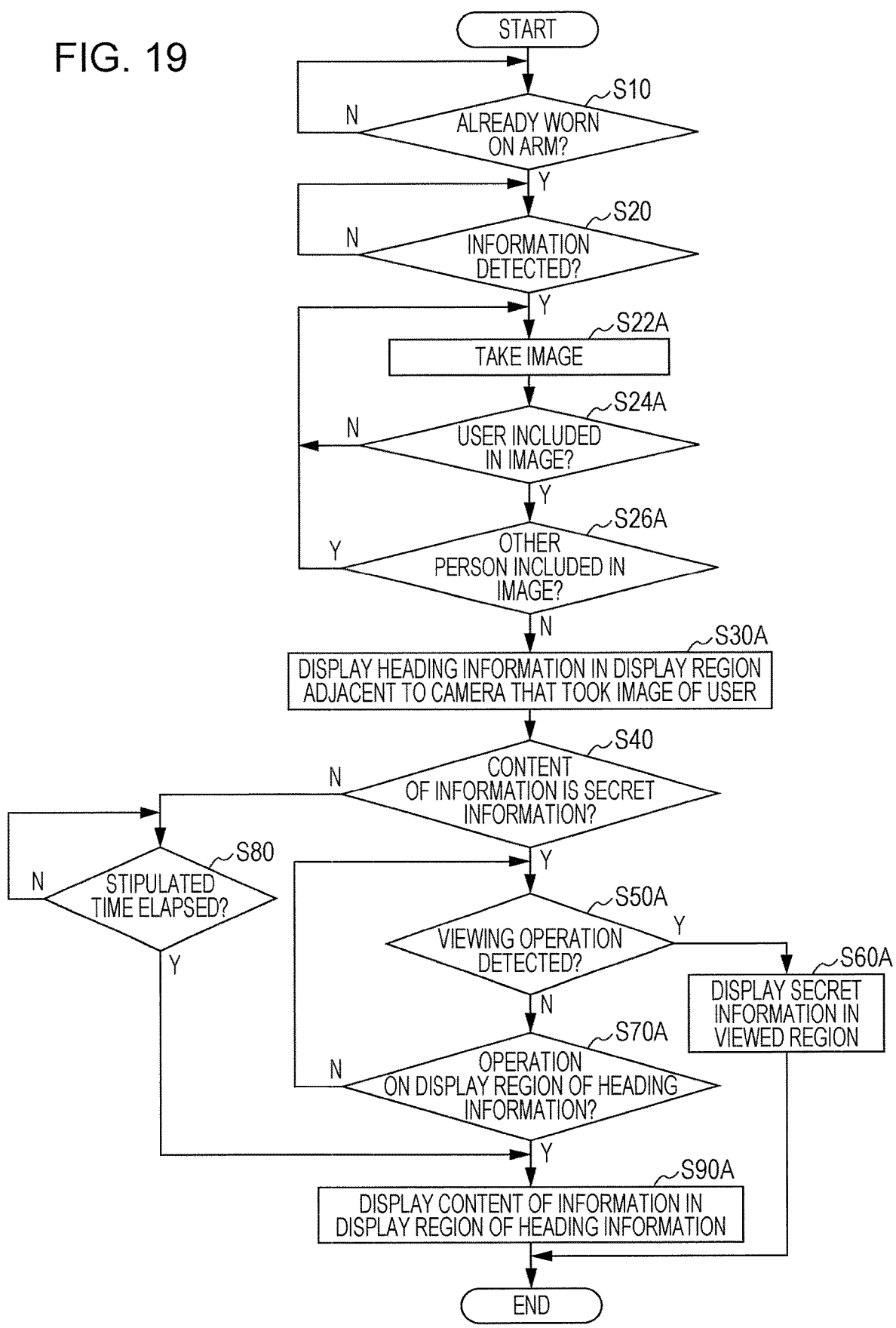
FIG. 19 is a flowchart illustrating one example of the flow of a display process according to Modification 1 of the second exemplary embodiment.

FIG. 19 is a flowchart illustrating one example of the flow of a display process executed by the CPU 21 in the case in which the power source of the wearable device 10A is set to on and the wearable device 10A boots up.

A wearable device 10A in which a flexible display is used for the display screen 12 is described herein, but a similar process is applied to a pendant-style wearable device 10A.

The display process of the wearable device 10A illustrated in FIG. 19 is different from the display process of the wearable device 10A illustrated in FIG. 16 in that steps S22, S24, S26, S30, S50, S60, S70, and S90 are replaced by steps S22A, S24A, S26A, S30A, S50A, S60A, S70A, and S90A, respectively, but otherwise is the same as the display process in FIG. 16.

In step S22A, the CPU 21 controls all of the cameras 9A to 9E provided in the wearable device 10A to take images, and stores each of the taken images in association with the cameras 9A to 9E in the RAM 23.

In step S24A, the CPU 21 determines whether or not an image including the user's face exists among the images taken in step S22A. In the case in which the user's face is not included in any of the images, the flow proceeds to step S22A, and images are taken again by each of the cameras 9A to 9E.

On the other hand, in the case in which any of the images taken in step S22A includes the user's face including the eyes, the flow proceeds to step S26A.

In step S26A, the CPU 21 determines whether or not the image that includes the user's face including the eyes (hereinafter called the "user image") includes the face of another person other than the user. In the case in which the face of another person other than the user is included in the user image, the flow proceeds to step S22A, and images are taken again by each of the cameras 9A to 9E.

On the other hand, in the case in which the face of another person other than the user is not included in the user image, the flow proceeds to step S30A.

Note that in the case in which multiple images include the user's face including the eyes, it is sufficient to select the image containing the largest area of the user's face included in the image as the user image, for example.

In step S30A, the CPU 21 displays heading information about a detected event in the region 3 adjacent to the camera 9 that took the user image.

In other words, the wearable device 10A does not necessarily display the heading information in the display region 1 disposed on the outer side of the arm, but instead displays the heading information in the region 3 that the user is confirmed to be viewing according to the image.

Subsequently, in the case of determining in step S40A that the content of the information expressed by the heading information is secret information, in step S50A, the CPU 21 determines whether or not a viewing operation of viewing a region 3 different from the region 3 where the heading information is displayed (hereinafter designated the "heading region 3") has been detected.

Specifically, in the case in which a movement amount of the arm and a rotation amount of the arm equal to or greater than stipulated values are detected by the motion sensor 8, the CPU 21 detects that the user has performed a viewing operation of viewing a region 3 different from the heading region 3. The stipulated values are set to minimum values of the movement amount of the arm and the rotation amount of the arm measured by the motion sensor 8 in the case in which the user views a region 3 different from the heading region 3, and are stored in the non-volatile memory 24 for example.

In the case in which a viewing operation of viewing a region 3 different from the heading region 3 is detected, the flow proceeds to step S60A.

In step S60A, the CPU 21 displays secret information related to the heading information in the region 3 viewed by the user.

The CPU 21 computes the degree of arm movement from the heading region 3 from the movement amount of the arm and the rotation amount of the arm measured by the motion sensor 8, and estimates the region 3 that the user is viewing after moving the arm.

In other words, the wearable device 10A does not necessarily display the secret information related to the heading information in the display region 2 disposed on the inner side of the arm, but instead displays the secret information in the region 3 that the user is estimated to be viewing from the degree of arm movement.

On the other hand, in the determination process of step S50A, in the case of determining that the user is still viewing the heading region 3, the flow proceeds to step S70A.

In step S70A, the CPU 21 determines whether or not an operation of the user pressing the heading region 3 has been detected through touch panel as one example of the input unit 5.

In the case of detecting the operation of the user pressing the heading region 3, since the operation is taken to be a declaration of intent by the user of wanting to check secret information in the heading information 3, the CPU 21 proceeds to step S90A and displays the secret information in the heading region 3.

On the other hand, in the case of not detecting the operation of the user pressing the heading region 3, the flow proceeds to step S50A. In other words, the CPU 21 repeatedly executes the determination processes of steps S50A and S70A until the user performs the viewing operation of viewing a region 3 different from the heading region 3 or the operation of pressing the heading region 3.

Note that in the case of proceeding from step S80 to S90A, in step S90A, the CPU 21 displays the content of the information expressed by the heading information in the heading region 3.

With the above, the display process illustrated in FIG. 19 ends.

In the display process illustrated in FIG. 19, in step S60A, the movement amount and the rotation amount measured by the motion sensor 8 are used to estimate the region 3 that the user is viewing after moving the arm, but images taken by the cameras 9 may also be used to specify the region that the user is viewing after moving the arm.

Specifically, after detecting the viewing operation of viewing a region 3 different from the heading region 3 in step S50A, the CPU 21 controls each of the cameras 9 to take an image. Subsequently, the CPU 21 extracts an image containing the user from among the images, detects the gaze of the user included in the extracted image, and selects the image that the user's gaze is pointing at as the user image.

Additionally, in the case in which another person other than the user is included in the selected user image, the CPU 21 continues to control each of the cameras 9 and take images until a user image containing the user only is obtained.

In the case in which a user image containing the user only is obtained, it is conceivable that the user is viewing the region 3 adjacent to the camera 9 that took the user image. Consequently, it is sufficient for the CPU 21 to display secret information related to the heading information in the region 3 adjacent to the camera 9 that took the user image.

Note that, as also described in the first exemplary embodiment, the wearable device 10A may also be configured to display information unrelated to the heading information in the region 3 adjacent to the camera 9 that took a user image containing the user only.

The foregoing thus describes the present disclosure using exemplary embodiments, but the present disclosure is not limited to the scope described in the exemplary embodiments. Various modifications or alterations may be made to the foregoing exemplary embodiments within a scope that does not depart from the gist of the present disclosure, and any embodiments obtained by such modifications or alterations are also included in the technical scope of the present disclosure. For example, the order of processes may be modified without departing from the gist of the present disclosure.

In the exemplary embodiments, a mode in which the display process is realized by software is described as one example, but processes equivalent to the flowcharts illustrated in FIGS. 6, 16, and 19 may also be implemented in an application-specific integrated circuit (ASIC) for example and processed by hardware. In this case, a speedup of the process is potentially achieved compared to the case of realizing the display process by software.

Also, the foregoing exemplary embodiments describe a mode in which the control program is installed in the ROM 22, but are not limited thereto. The control program according to the present disclosure may also be provided by being recorded on a computer-readable storage medium. For example, the control program according to the present disclosure may be provided by being recorded on an optical disc, such as a Compact Disc-Read-Only Memory (CD-ROM) or a Digital Versatile Disc-Read-Only Memory (DVD-ROM). Also, the control program according to the present disclosure may be provided by being recorded on semiconductor memory such as Universal Serial Bus (USB) memory or flash memory. Furthermore, the wearable device 10 or 10A may also acquire the control program according to the present disclosure from an external device connected to a communication link through the communication unit 4.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A wearable device comprising:
   a display screen on which information is displayed in a first region and a second region;

a processor configured to:
detect an operation for causing information to be displayed in the second region; and
in a state in which the display screen is worn on an arm, in a case of detecting the operation after displaying a first information that does not need to be kept secret in the first region disposed at a position on an outer side of the arm that is visible to other people, if a content of the first information is secret information, control a display of the content of the first information in the second region disposed at a position on an inner side of the arm that is less visible to other people than the position on the outer side of the arm, if the content of the first information is non-secret information, control a display of the content of the first information in the first region after predetermined time has passed.

2. The wearable device according to claim 1, wherein the processor further configured to detect the wearing of the display screen on the arm, wherein
in a case of detecting that the display screen is being worn on the arm, the processor further configured to display the first information in the first region.

3. The wearable device according to claim 2, wherein the processor further configured to detect that the display screen is being worn on the arm in a case of detecting a pulse, and additionally detect a position on the outer side of the arm and a position on the inner side of the arm on the display screen from the detected position of the pulse, and
the processor further configured to control a placement of each of the first region and the second region at the position on the outer side of the arm and the position on the inner side of the arm.

4. The wearable device according to claim 2, wherein wearing members for wearing the display screen on the arm are provided on both ends of the display screen, and
in a case in which the processor detects that the wearing members are connected to each other, the processor further configured to control a placement of the first region at a first distance predetermined as a distance along the arm from a connection position of the wearing members to a position on the outer side of the arm, and a placement of the second region at a second distance predetermined as a distance along the arm from the connection position of the wearing members to a position on the inner side of the arm.

5. The wearable device according to claim 1, wherein the processor further configured to detect an operation of a wearer of the wearable device attempting to look at the second region as the operation for causing information to be displayed in the second region.

6. The wearable device according to claim 5, wherein the processor further configured to detect a physical quantity expressing a degree of arm movement, and in a case in which the physical quantity is included inside a range when the inner side of the arm is upward, the processor further configured to detect that the operation for causing information to be displayed in the second region has been performed.

7. The wearable device according to claim 5, wherein the processor further configured to specify a gaze of the wearer of the wearable device from an image including the eyes of the wearer of the wearable device taken by an image-taking device, and in a case in which the specified gaze is pointing at the second region, the processor further configured to detect that the operation for causing information to be displayed in the second region has been performed.

8. The wearable device according to claim 1, wherein the processor further configured to control the display such that secret information displayed in the second region is oriented in a different direction from a display direction of the first information displayed in the first region.

9. The wearable device according to claim 8, wherein the processor further configured to control the display such that the display direction of the secret information displayed in the second region is orthogonal to the display direction of the first information displayed in the first region.

10. The wearable device according to claim 1, wherein the processor further configured to control the display, in the second region, of secret information that is related to a content of the first information displayed in the first region.

11. The wearable device according to claim 10, wherein the processor further configured to control the display, in the first region, of information notifying the wearer of the wearable device of an occurrence of an event, and controls the display, in the second region, of a content of the event displayed in the first region.

12. A non-transitory computer readable medium storing a program causing a computer to execute a process for functioning as the processor of the wearable device according to claim 1.

13. A wearable device comprising:
a display screen on which information is displayed in a first region and a second region;
a processor configured to:
take an image via a camera in a state in which the display screen is worn on an au ii of a user,
display non-secret information in the first region in a case of detecting the user in the image,
stop displaying the non-secret information in the first region in a case of detecting at least one person other than a user of the wearable device in the image,
detect an operation for causing information to be displayed in the second region; and
in a state in which the display screen is worn on the arm, in a case of detecting the operation after displaying the non-secret information in the first region disposed at a position on an outer side of the arm that is visible to other people, control a display of secret information in the second region disposed at a position on an inner side of the arm that is less visible to other people than the position on the outer side of the arm.

* * * * *